(12) United States Patent
Lee et al.

(10) Patent No.: US 12,114,194 B2
(45) Date of Patent: Oct. 8, 2024

(54) METHOD AND APPARATUS FOR MEASUREMENT AND REPORTING FOR MULTI-BEAM OPERATIONS

(71) Applicant: Samsung Electronics Co., Ltd., Suwon-si (KR)

(72) Inventors: Gilwon Lee, Plano, TX (US); Jeongho Jeon, San Jose, CA (US); Joonyoung Cho, Portland, OR (US); Md. Saifur Rahman, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 145 days.

(21) Appl. No.: 17/148,467

(22) Filed: Jan. 13, 2021

(65) Prior Publication Data

US 2022/0053353 A1 Feb. 17, 2022

Related U.S. Application Data

(60) Provisional application No. 63/072,630, filed on Aug. 31, 2020, provisional application No. 63/065,807, filed on Aug. 14, 2020.

(51) Int. Cl.
*H04W 24/10* (2009.01)
*H04B 7/0408* (2017.01)
(Continued)

(52) U.S. Cl.
CPC .......... *H04W 24/10* (2013.01); *H04B 7/0408* (2013.01); *H04L 5/0048* (2013.01);
(Continued)

(58) Field of Classification Search
None
See application file for complete search history.

(56) References Cited

U.S. PATENT DOCUMENTS 9,198,070 B2  11/2015  Krishnamurthy et al.
10,574,486 B2  2/2020  Park et al.
(Continued)

FOREIGN PATENT DOCUMENTS

EP  3381133 B1  8/2019
KR  10-2018-0071387 A  6/2018
(Continued)

OTHER PUBLICATIONS

"3rd Generation Partnership Project; Technical Specification Group Radio Access Network; NR; Physical channels and modulation (Release 16)", 3GPP TS 38.211 V16.1.0, Mar. 2020, 130 pages.
(Continued)

*Primary Examiner* — Liem H. Nguyen

(57) ABSTRACT

A user equipment (UE) is configured to perform a method for measuring and reporting multi-beam operations. The UE includes a transceiver configured to communicate via a multi-beam operation with a base station. The UE further includes a processor operably connected to the transceiver. The processor is configured to at least one of: transmit, via the transceiver through a first set of antenna ports, one or more uplink (UL) reference signals (RSs), or receive, via the transceiver, one of: one or more downlink (DL) RSs transmitted by a base station (BS), or the one or more transmitted UL RSs, measure, via the transceiver using a second set of antenna ports, signal qualities of the one or more UL RSs and the one or more DL RSs for a time period, and perform measurement reporting of the measured signal qualities.

17 Claims, 27 Drawing Sheets

(51) Int. Cl.
| | |
|---|---|
| *H04L 5/00* | (2006.01) |
| *H04L 41/0668* | (2022.01) |
| *H04W 24/08* | (2009.01) |
| *H04W 72/21* | (2023.01) |
| *H04W 88/06* | (2009.01) |

(52) U.S. Cl.
CPC ......... *H04L 41/0668* (2013.01); *H04W 24/08* (2013.01); *H04W 72/21* (2023.01); *H04W 88/06* (2013.01)

(56) References Cited

U.S. PATENT DOCUMENTS

| | | | | |
|---|---|---|---|---|
| 10,601,484 | B2* | 3/2020 | Yum | H04L 5/0094 |
| 10,659,123 | B2* | 5/2020 | Lee | H04B 7/088 |
| 10,903,877 | B2* | 1/2021 | Yu | H04B 7/088 |
| 2017/0251518 | A1* | 8/2017 | Agiwal | H04W 76/28 |
| 2018/0034531 | A1* | 2/2018 | Sadiq | H04B 7/0695 |
| 2018/0145808 | A1* | 5/2018 | Kim | H04W 72/542 |
| 2019/0207722 | A1* | 7/2019 | Gao | H04L 5/005 |
| 2019/0253949 | A1* | 8/2019 | Park | H04W 36/14 |
| 2019/0260485 | A1 | 8/2019 | Byun et al. | |
| 2019/0268185 | A1* | 8/2019 | Wang | H04L 27/2605 |
| 2019/0341984 | A1* | 11/2019 | Zhu | H04B 7/0695 |
| 2019/0349058 | A1* | 11/2019 | Raghavan | H04B 7/0691 |
| 2019/0349063 | A1* | 11/2019 | Takano | H04B 7/0695 |
| 2019/0379433 | A1* | 12/2019 | Chen | H04L 5/0051 |
| 2020/0014453 | A1* | 1/2020 | Takeda | H04W 74/0833 |
| 2020/0127803 | A1* | 4/2020 | Luo | H04B 7/0854 |
| 2020/0187128 | A1* | 6/2020 | Yao | H04W 52/367 |
| 2020/0229122 | A1* | 7/2020 | Kim | H04W 64/00 |
| 2020/0351674 | A1* | 11/2020 | Zhou | H04W 56/001 |
| 2020/0359270 | A1* | 11/2020 | Zhang | H04W 72/0446 |
| 2021/0006328 | A1* | 1/2021 | Kim | H04W 72/23 |
| 2021/0044385 | A1* | 2/2021 | Hosseini | H04L 5/0051 |
| 2021/0159963 | A1* | 5/2021 | Akkarakaran | H04B 7/06954 |
| 2021/0359806 | A1* | 11/2021 | Levitsky | H04L 5/0051 |
| 2021/0376894 | A1* | 12/2021 | Cha | H04B 7/0695 |
| 2021/0376905 | A1* | 12/2021 | Zhou | H04W 72/0413 |
| 2022/0014397 | A1* | 1/2022 | Taherzadeh Boroujeni | H04L 25/0238 |
| 2022/0045734 | A1* | 2/2022 | Liu | H04L 5/0025 |
| 2022/0045792 | A1* | 2/2022 | Song | H04L 5/0048 |
| 2022/0060221 | A1* | 2/2022 | Ko | H04B 7/088 |
| 2022/0140883 | A1* | 5/2022 | Bengtsson | H04B 7/0874 375/267 |
| 2022/0183072 | A1* | 6/2022 | Kang | H04W 74/0833 |
| 2022/0311477 | A1* | 9/2022 | Sun | H01Q 15/246 |
| 2023/0146581 | A1* | 5/2023 | Zhang | H04W 24/10 370/329 |
| 2023/0246683 | A1* | 8/2023 | Li | G01S 5/10 375/262 |

FOREIGN PATENT DOCUMENTS

| | | | |
|---|---|---|---|
| KR | 10-2019-0133029 A | | 11/2019 |
| WO | WO-2020144624 A1 | * | 7/2020 |
| WO | WO-2020173286 A1 | * | 9/2020 ........... H04L 1/0023 |
| WO | WO-2020253585 A1 | * | 12/2020 ........... H04B 7/0404 |
| WO | WO-2022032596 A1 | * | 2/2022 |

OTHER PUBLICATIONS

"3rd Generation Partnership Project; Technical Specification Group Radio Access Network; NR; Multiplexing and channel coding (Release 16)", 3GPP TS 38.212 V16.1.0, Mar. 2020, 146 pages.

"3rd Generation Partnership Project; Technical Specification Group Radio Access Network; NR; Physical layer procedures for control (Release 16)" 3GPP TS 38.213 V16.1.0, Mar. 2020, 156 pages.

"3rd Generation Partnership Project; Technical Specification Group Radio Access Network; NR; Physical layer procedures for data (Release 16)", 3GPP TS 38.214 V16.1.0, Mar. 2020, 151 pages.

"3rd Generation Partnership Project; Technical Specification Group Radio Access Network; NR; Physical layer measurements (Release 16)", 3GPP TS 38.215 v16.1.0, Mar. 2020, 22 pages.

"3rd Generation Partnership Project; Technical Specification Group Radio Access Network; NR; Medium Access Control (MAC) protocol specification (Release 16)", 3GPP TS 38.321 v16.0.0, Mar. 2020, 141 pages.

"3rd Generation Partnership Project; Technical Specification Group Radio Access Network; NR; Radio Resource Control (RRC) protocol specification (Release 16)", 3GPP TS 38.331 v16.0.0, Mar. 2020, 835 pages.

"3rd Generation Partnership Project; Technical Specification Group Radio Access Network; Evolved Universal Terrestrial Radio Access (E-UTRA); Physical channels and modulation (Release 16)", 3GPP TS 36.211 v16.1.0, Mar. 2020, 247 pages.

"3rd Generation Partnership Project; Technical Specification Group Radio Access Network; Evolved Universal Terrestrial Radio Access (E-UTRA); Multiplexing and channel coding (Release 16)", 3GPP TS 36.212 v16.1.0, Mar. 2020, 253 pages.

"3rd Generation Partnership Project; Technical Specification Group Radio Access Network; Evolved Universal Terrestrial Radio Access (E-UTRA); Physical layer procedures (Release 16)", 3GPP TS 36.213 v16.1.0, Mar. 2020, 570 pages.

"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321 v16.0.0, Mar. 2020, 141 pages.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 v16.0.0, Mar. 2020, 1,048 pages.

International Search Report and Written Opinion of the International Searching Authority in connection with International Application No. PCT/KR2021/010793 issued Dec. 1, 2021, 9 pages.

Extended European Search Report issued Sep. 26, 2023 regarding Application No. 21856284.1, 15 pages.

NTT Docomo, Inc., "Work plan for Rel-15 NR WI", 3GPP TSG RAN WG1 Meeting #90bis, R1-1718177, Oct. 2017, 173 pages.

* cited by examiner

METHOD AND APPARATUS FOR MEASUREMENT AND REPORTING FOR MULTI-BEAM OPERATIONS

CROSS-REFERENCE TO RELATED APPLICATIONS AND CLAIM OF PRIORITY

The present application claims priority to U.S. Provisional Patent Application No. 63/065,807 filed on Aug. 14, 2020 and U.S. Provisional Patent Application No. 63/072,630 filed on Aug. 31, 2020. The content of the above-identified patent documents is incorporated herein by reference.

TECHNICAL FIELD

The present disclosure relates to electronic devices and methods on measurement and reporting for multi-beam operation, more particularly, to electronic devices and methods on self-interference measurement and reporting for beam-specific downlink and uplink operations in wireless networks.

BACKGROUND

A basic philosophy of New Radio (NR) in $3^{rd}$ Generation Partnership Project (3GPP) is to support beam-specific operations for wireless communication between a gNode B (gNB) and a user equipment (UE). There are several components in the 5G (e.g., fifth generation) NR specification that can efficiently be operated in a beam-specific manner. To facilitate beam management for beam specific downlink and uplink operations, self-interference measurement and reporting is essential. Current 5G NR systems do not include components for self-interference and reporting

SUMMARY

Embodiments of the present disclosure provide methods and apparatuses for full power UL MIMO operation in an advanced wireless communication system.

In one embodiment, a user equipment (UE) is provided. The UE includes a transceiver configured to communicate via a multi-beam operation with a base station. The UE further includes a processor operably connected to the transceiver. The processor is configured to at least one of: transmit, via the transceiver through a first set of antenna ports, one or more uplink (UL) reference signals (RSs), or receive, via the transceiver, one of: one or more downlink (DL) RSs transmitted by a base station (BS), or the one or more transmitted UL RSs, measure, via the transceiver using a second set of antenna ports, signal qualities of the one or more UL RSs and the one or more DL RSs for a time period, and perform measurement reporting of the measured signal qualities.

In yet another embodiment, a method is provided. The method comprises at least one of: transmitting, via a transceiver using a first set of antenna ports, one or more uplink (UL) reference signals (RSs), receiving, via the transceiver, one of: one or more downlink (DL) RSs transmitted by a base station (BS), or the one or more transmitted UL RSs; measuring, by a processor via the transceiver using a second set of antenna ports, signal qualities of the one or more UL RSs and the one or more DL RSs for a time period; and performing, by the processor, measurement reporting of the measured signal qualities.

In another embodiment, a non-transitory computer readable medium is provided. The non-transitory computer readable medium includes a plurality of instructions that, when executed by a processor of a user equipment (UE), causes the processor to: at least one of: transmit, via a transceiver of the UE through a first set of antenna ports, one or more uplink (UL) reference signals (RSs), or receive, via the transceiver, one of: one or more downlink (DL) RSs transmitted by a base station (BS), the one or more transmitted UL RSs measure, via the transceiver using a second set of antenna ports, signal qualities of the one or more UL RSs and the one or more DL RSs for a time period, and perform measurement reporting of the measured signal qualities.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
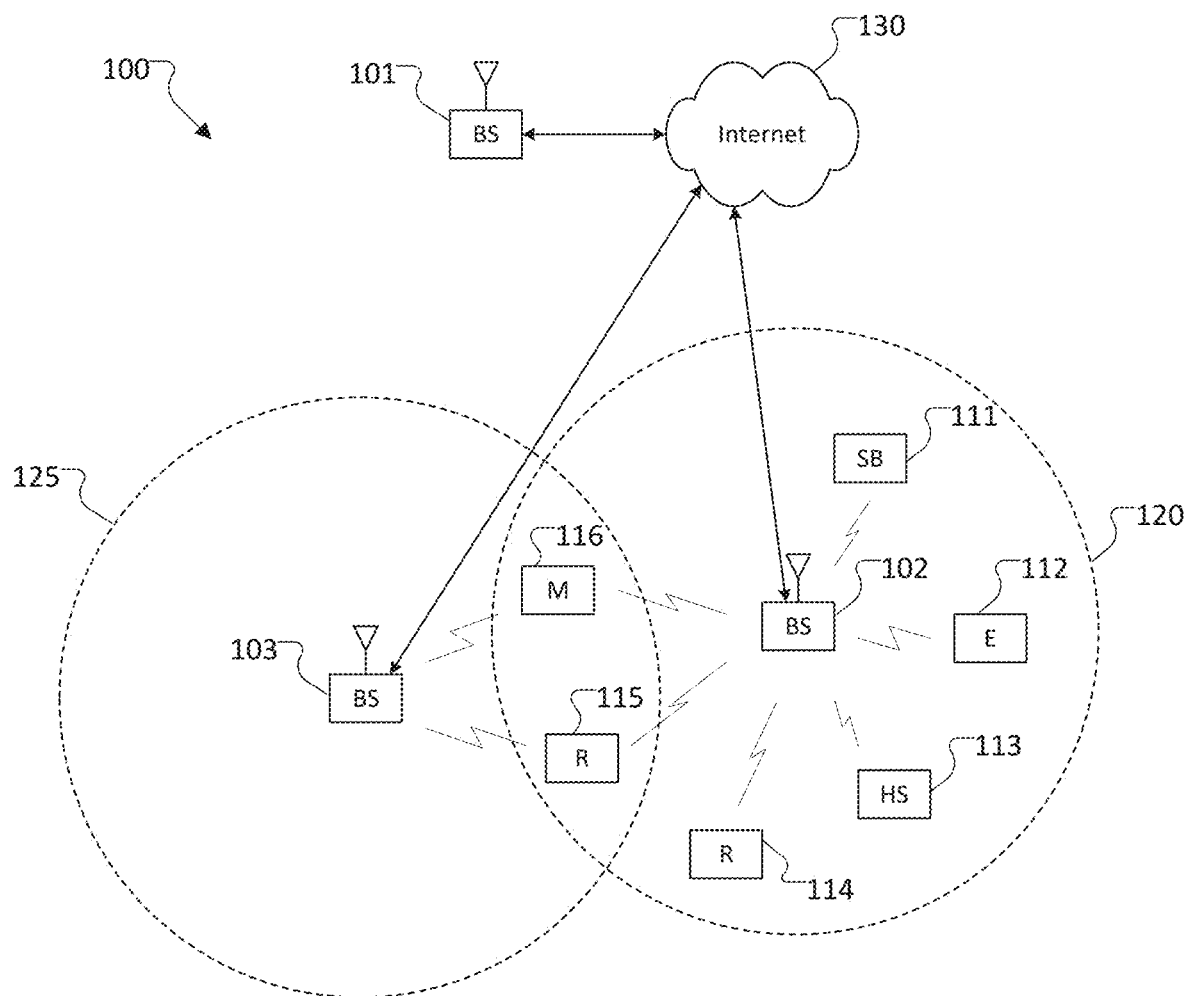
FIG. 1 illustrates an example wireless network according to embodiments of the present disclosure.

FIG. 1 through FIG. 34, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v16.1.0, "E-UTRA, Physical channels and modulation;" 3GPP TS 36.212 v16.1.0, "E-UTRA, Multiplexing and Channel coding;" 3GPP TS 36.213 v16.1.0, "E-UTRA, Physical Layer Procedures;" 3GPP TS 36.321 v16.0.0, "E-UTRA, Medium Access Control (MAC) protocol specification;" 3GPP TS 36.331 v16.0.0, "E-UTRA, Radio Resource Control (RRC) protocol specification;" 3GPP TS 38.211 v16.1.0, "NR, Physical channels and modulation;" 3GPP TS 38.212 v16.1.0, "NR, Multiplexing and Channel coding;" 3GPP TS 38.213 v16.1.0, "NR, Physical Layer Procedures for control;" 3GPP TS 38.214 v16.1.0, "NR, Physical layer procedures for data;" 3GPP TS 38.215 v16.1.0, "NR, Physical Layer Measurements;" 3GPP TS 38.321 v16.0.0, "NR, Medium Access Control (MAC) protocol specification;" and 3GPP TS 38.331 v16.0.0, "NR, Radio Resource Control (RRC) protocol specification."

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both Frequency Division Duplexing (FDD) and Time Division Duplexing (TDD) are considered as the duplex method for both DL and UL signaling.

Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying (FSK) and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
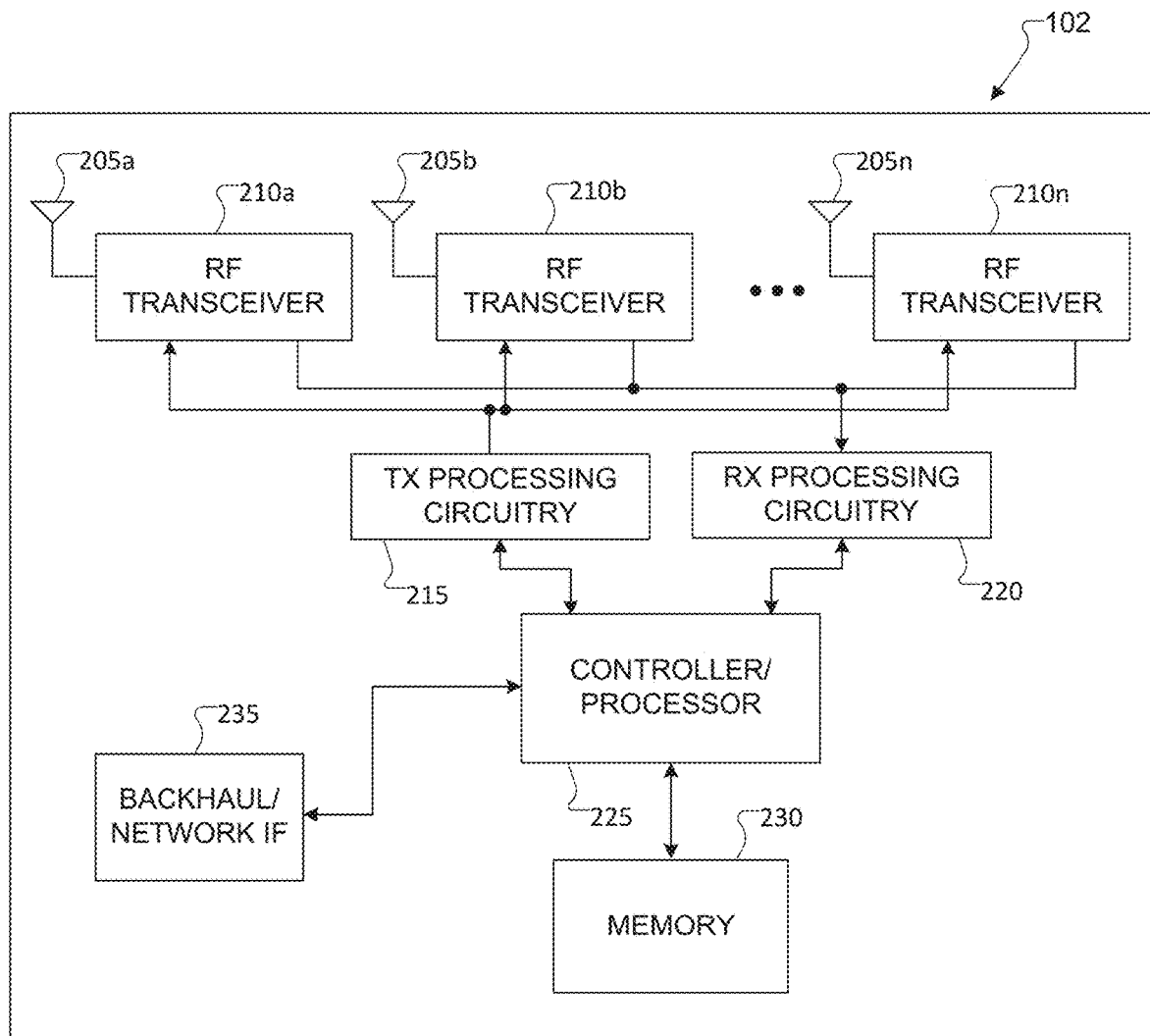
FIG. 2 illustrates an example gNB according to embodiments of the present disclosure.
Figure 3:
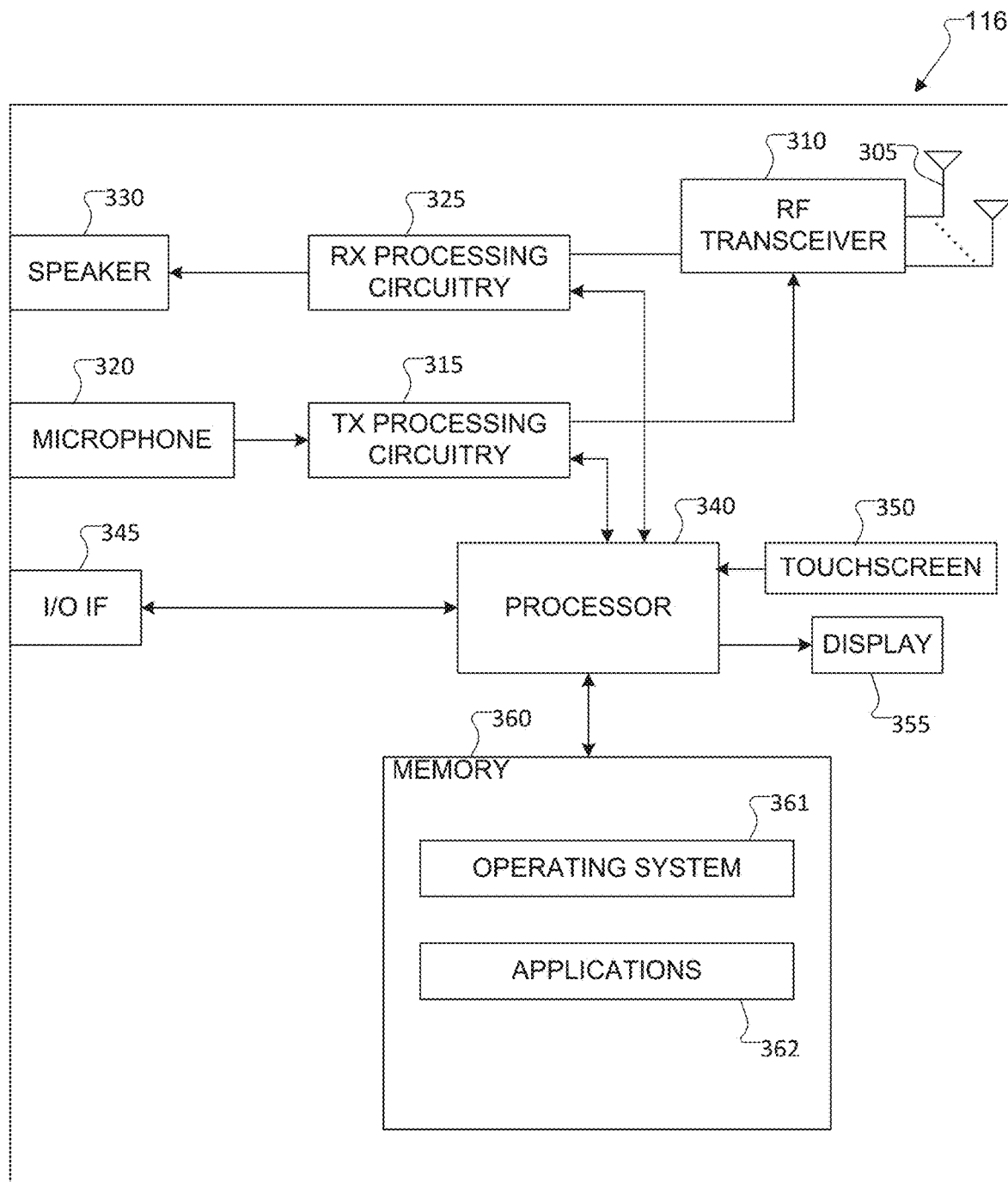
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of gNB 101, gNB 102 and gNB 103 include a two-dimensional (2D) antenna arrays as described in embodiments of the present disclosure. In some embodiments, one or more of gNB 101, gNB 102 and gNB 103 support the codebook design and structure for systems having 2D antenna arrays.

As described in more detail below, one or more of the UEs 111-116 include circuitry, programing, or a combination thereof, for measuring signal qualities of the one or more UL RSs and the one or more DL RSs for a time period, and performing measurement reporting of the measured signal qualities. In certain embodiments, and one or more of the gNBs 101-103 includes circuitry, programing, or a combination thereof, to facilitate measurement reporting by the UE in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. That is, the controller/processor 225 can perform a blind interference sensing (BIS) process, such as performed by a BIS algorithm, and decode the received signal subtracted by the interfering signals. Any of a wide variety of other functions can be supported in the gNB 102 by the controller/processor 225. In some embodiments, the controller/processor 225 includes at least one microprocessor or microcontroller In certain embodiments, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also capable of supporting channel quality measurement and reporting for systems having 2D antenna arrays as described in embodiments of the present disclosure. In some embodiments, the controller/processor 225 supports communications between entities, such as web RTC. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM. In certain embodiments, a plurality of instructions, such as a BIS algorithm is stored in memory 230. The plurality of instructions are configured to cause the controller/processor 225 to perform the BIS process and to decode a received signal after subtracting out at least one interfering signal determined by the BIS algorithm.

As described in more detail below, the transmit and receive paths of the gNB 102 (implemented using the RF transceivers 210a-210n, TX processing circuitry 215, and/or RX processing circuitry 220) support communication with aggregation of FDD cells and TDD cells.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350 (or key pad), a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for UL transmission on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
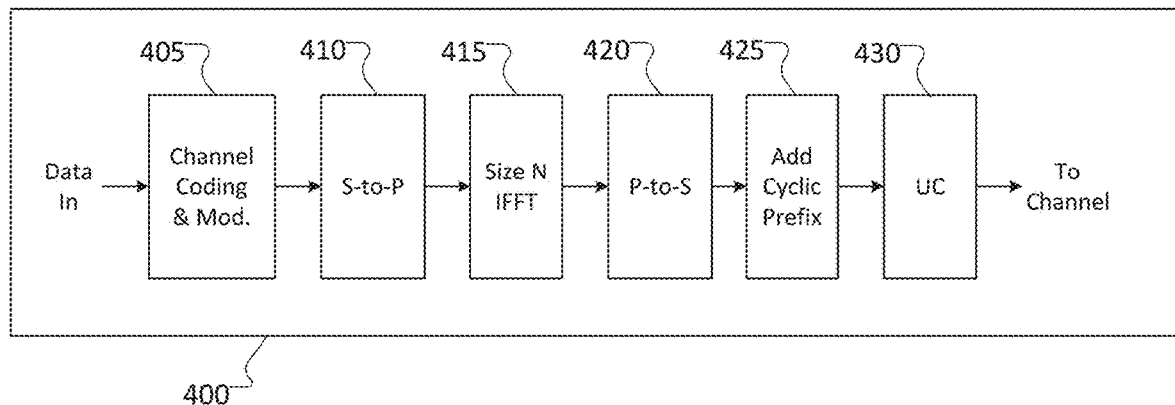
FIG. 4A illustrates a high-level diagram of an orthogonal frequency division multiple access transmit path according to embodiments of the present disclosure.
Figure 4B:
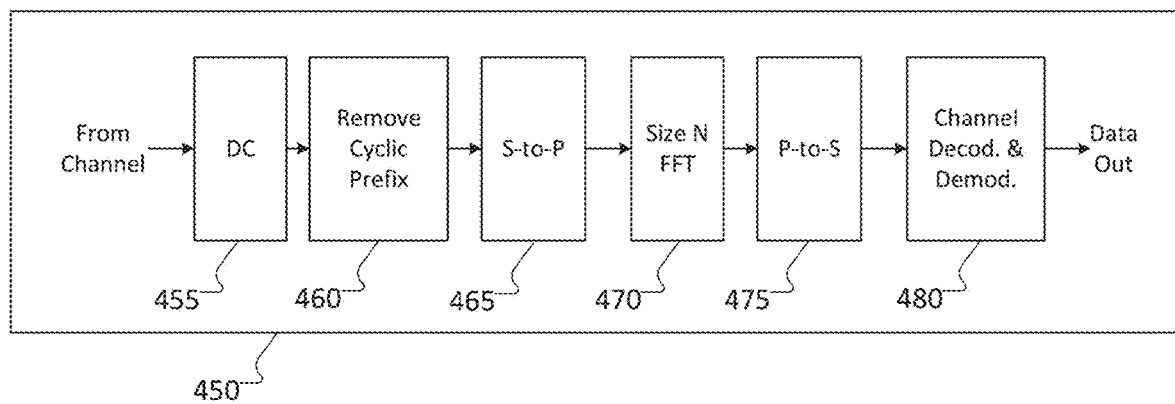
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement (ACK) information in response to data transport block (TB) transmission from a UE in a physical hybrid ARQ indicator channel (PHICH). An eNodeB transmits one or more of multiple types of RS including a UE-common RS (CRS), a channel state information (CSI)-RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct, e.g., acknowledgement (ACK), or incorrect, e.g., negative acknowledgement (NACK), detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$ where $N_{SRS}=1$ if a last subframe symbol is used to transmit SRS and $N_{SRS}=0$ otherwise.

As operating frequency bands in NR become higher, the UE is evolving to accommodate a plurality of antenna panels to enhance aspects of multi-beam operation such as coverage enhancement, beam failure event minimization, fast beam switching, etc. Depending on hardware architectures, each panel on the UE 116 can perform multi-beam operation in a decoupled manner so that it is possible for the UE 116 to be capable of simultaneously DL/UL operations via multiple beam links, each of which corresponds to sufficiently reliable channels to independently communicate with gNB 102. The previous NR specification only allows multiple panels on UE 116 to be used for simultaneous DL reception or single panel selection for UL transmission in TDD operation.

Figure 5:
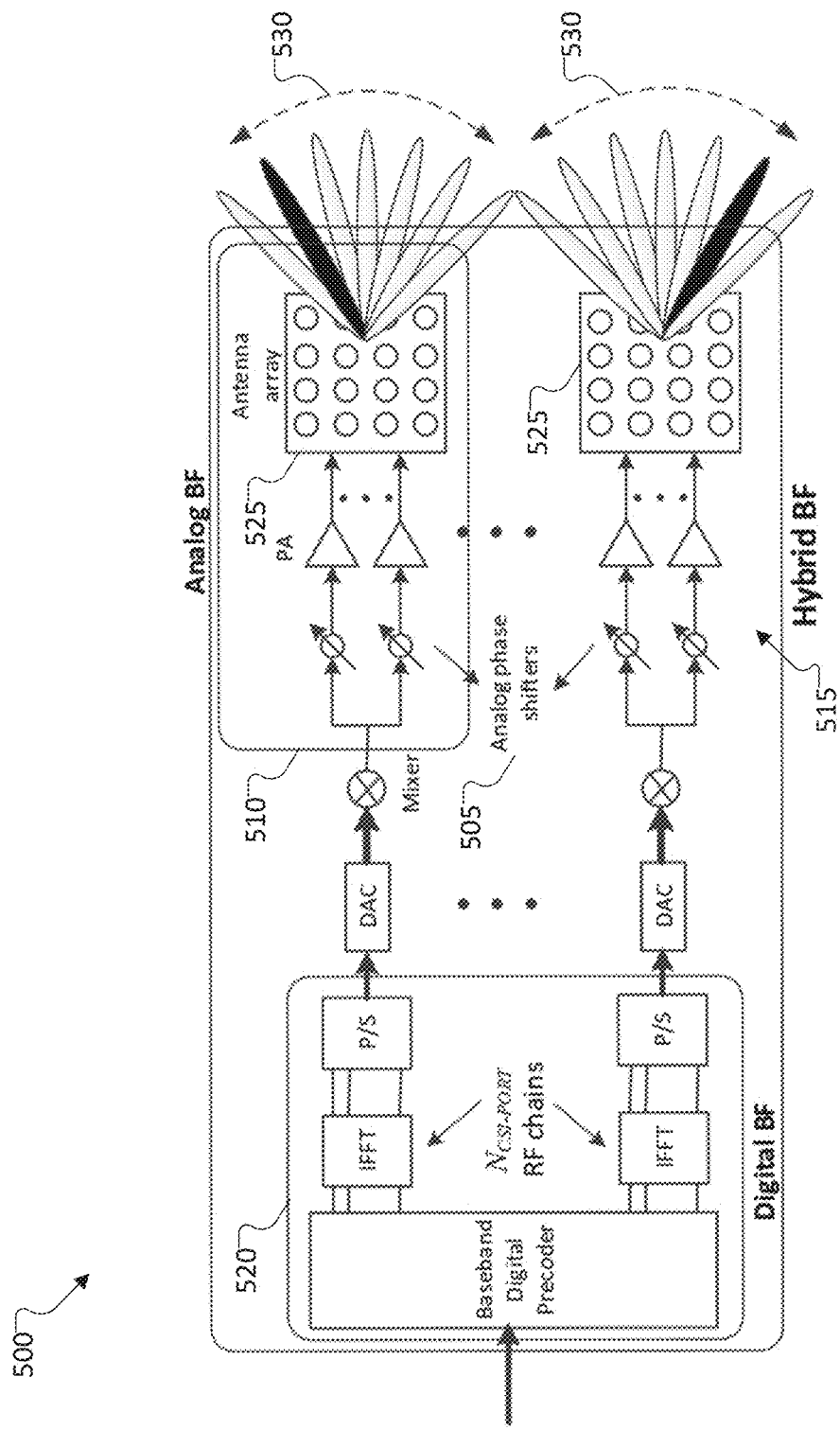
FIG. 5 illustrates an example antenna according to embodiments of the present disclosure.

FIG. 5 illustrates an example antenna blocks 500 according to embodiments of the present disclosure. The embodiment of the antenna 500 illustrated in FIG. 5 is for illustration only. FIG. 5 does not limit the scope of this disclosure to any particular implementation of the antenna 500. In certain embodiments, one or more of gNB 102 or UE 116 include the antenna 500. For example, one or more of antenna 205 and its associated systems or antenna 305 and its associated systems can be configured the same as antenna 500.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies).

In the example shown in FIG. 5, the antenna 500 includes analog phase shifters 505, an analog beamformer (BF) 510, a hybrid BF 515, a digital BF 520, and one or more antenna arrays 525. In this case, one CSI-RS port is mapped onto a large number of antenna elements in antenna arrays 525, which can be controlled by the bank of analog phase shifters 505. One CSI-RS port can then correspond to one sub-array which produces a narrow analog beam through analog beamforming by analogy BF 510. The analog beam can be configured to sweep 530 across a wider range of angles by varying the phase shifter bank 505 across symbols or subframes. The number of sub-arrays (equal to the number of RF chains) is the same as the number of CSI-RS ports $N_{CSI-PORT}$. A digital BF 515 performs a linear combination across $N_{CSI-PORT}$ analog beams to further increase precoding gain. While analog beams are wideband (hence not frequency-selective), digital precoding can be varied across frequency sub-bands or resource blocks.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

Additionally, the antenna 500 system is also applicable to higher frequency bands such as >52.6 GHz (also termed the FR4). In this case, the system can employ only analog beams. Due to the O2 absorption loss around 60 GHz frequency (~10 decibels (dB) additional loss @100 m distance), larger number of and sharper analog beams (hence larger number of radiators in the array) will be needed to compensate for the additional path loss.

An antenna port is defined such that the channel over which a symbol on the antenna port is conveyed can be inferred from the channel over which another symbol on the same antenna port is conveyed. Two antenna ports are said to be quasi co-located (QCL) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

A UE can be configured with a list of up to M transmission configuration indicator (TCI)-State configurations within the higher layer parameter PDSCH-Config to receive PDSCH in a serving cell where M depends on the UE capability maxNumberConfiguredTCIstatesPerCC. Each TCI-State contains parameters for configuring a QCL relationship between one or two downlink reference signals and the DMRS ports of the PDSCH, the DMRS port of a corresponding PDCCH, or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

The UE receives a MAC-CE activation command to map up to N, such as N=8, TCI states to the codepoints of the DCI field 'Transmission Configuration Indication'. When the HARQ-ACK information corresponding to the PDSCH carrying the MAC-CE activation command is transmitted in slot n, the indicated mapping between TCI states and codepoints of the DCI field 'Transmission Configuration Indication' should be applied after a MAC-CE application time, e.g starting from the first slot that is after slot $n+3N_{slot}^{slotsubframe,\mu}$ where $N_{slot}^{subframe,\mu}$ is a number of slot per subframe for subcarrier spacing (SCS) configuration μ.

As operating frequency bands in NR become higher, the UE is evolving to accommodate a plurality of antenna arrays 525 or panels (each panel is able to transmit via one analog beam, e.g., analog BF 510) to enhance aspects of multi-beam operation such as coverage enhancement, beam failure event minimization, fast beam switching, and the like. By utilizing the capability of multiple panels, UE 116 is able to obtain a variety of diversity gains, which comes from dynamic selection of panel(s) with the best quality in terms of performance that systems want to optimize. For example, in 3GPP 5G NR Rel-17, new features to facilitate UL beam/panel selection for UEs equipped with multiple panels is being identified and specified under a unified transmission configuration indicator (TCI) framework, in order to mitigate UL coverage loss from several aspects such as maximum permissible exposure (MPE) issues on UE 116.

For example, a beam corresponds to a spatial transmission/reception filter that is used by the UE 116 and/or gNB 102. In one example, a beam can correspond to a spatial reception filter that is used by the UE 116 to receive a reference signal, such as an synchronization signals (SS) and physical broadcast channel (PBCH) (SS/PBCH block (SSB)) and/or a CSI-RS and so on. In another example, a beam can correspond to a spatial transmission filter that is used by the UE 116 to transmit a reference signal, such as an UL sounding reference signal (SRS) and so on.

A beam training and measurement procedure can include, for example, a procedure wherein the gNB 102 configures the UE 116 with a set of reference signal (RS) resources, such as SSB resources and/or CSI-RS resources, as well as a configuration for report settings, such that the UE can report beam quality metric(s) measurement(s), such as Reference Signal Received Power (RSRP), Reference Signal Received Quality (RSRQ), Received Signal Strength Indicator (RSSI), Signal to Noise Ratio (SNR), Signal to Interference and Noise Ratio (SINR), and so on, each of which can be, e.g., a L-1 measurement or a filtered L-3 measurement. In one example, a UE 116 and/or a gNB 102 can transmit a reference signal (RS), such as a Synchronization Signal Block (SSB) or a CSI-RS or an SRS with a number of repetitions using a same spatial transmission filter in multiple occasions, so that the gNB 102 and/or UE 116, respectively, can receive the RS with different spatial reception filters, in order to facilitate beam sweeping and identification of a candidate/best beam based on a quality metric, such as L1/L3 RSRP or SINR. In one example, a selection of different spatial reception filters and/or quality metric and/or selection procedure can be per UE/gNB implementation.

A beam indication procedure can include, for example, a procedure wherein the gNB 102 can indicate to the UE 116 to transmit an uplink channel (and/or a second uplink signal) with a same spatial filter that was used to receive a (first) reference signal. In another example, the gNB 102 can indicate to the UE 116 to receive a downlink channel (and/or a second downlink signal) with a same spatial filter that was used to receive a (first) reference signal. Such indication can be, e.g., a DCI and/or MAC-CE, and/or radio resource control (RRC) signaling.

In one example, an antenna panel or, simply a panel, can refer to an antenna array 525 or an antenna sub-array connected to one or multiple RF chains. In one example, a panel can be referred to as a transmission-reception entity (TRE), which can virtualize multiple physical panels into a single virtual panel, based on a transparent UE/gNB implementation, such as MIMO diversity scheme(s).

In previous NR configurations, such as up to release 17 (Rel-17 NR), multiple panels on the UE have been primarily used for simultaneous DL reception or single panel selection for UL transmission, respectively, which could correspond to some limited capability of what multiple panels on UE are able to do. Depending on hardware architectures, as an example, each panel on UE 116 is able to perform multi-beam operation in a decoupled manner so that the UE 116 is capable of simultaneously DL and UL operations via multiple beam links, each of which corresponds to sufficiently reliable channels to independently communicate with gNB 102. Here, the multiple beam links could be associated with one or multiple panels. For example, each of the beam links can have a different associated panel. Accordingly, it is expected that more features of the multi-beam operation to exploit the capability of UE having massive multiple panels will be specified to further improve performance of multi-beam UE in the future standard releases.

In addition to multi-beam operation, dynamic TDD is one of the key features of NR that allows that a slot, or one or more parts of a slot, is dynamically allocated to either uplink or downlink as part of the scheduler decision. Compared to LTE systems where the split between DL and UL resources in the time domain was semi-statically determined, dynamic TDD is able to provide more flexible/dynamic DL and UL resource allocation in parts of a slot or multiple slots, and thus it could improve several aspects such as load balancing between DL and UL resources, UL coverage, power saving issues, and so forth.

In NR, three different signaling mechanisms for dynamic TDD to provide information for UE on whether the resources are used for uplink or downlink transmission are: 1) dynamic signaling for the scheduled UE; 2) semi-static signaling using RRC; and 3) dynamic slot-format indication. Combinations of these three mechanisms are also supported. All of the signaling mechanisms for dynamic TDD can support "cell-specific" or "UE-specific" DL/UL resource allocation so far. For example, in the current NR standards, one or multiple UEs in a cell can be configured with a same DL/UL slot pattern which can contain DL, UL, and/or flexible slots. Then, for the flexible slots (if configured), DL/UL symbol patterns can be differently assigned for each of the UEs in a UE-specific manner. It has not been supported that DL/UL resources can be allocated in a "beam-specific" manner where different DL/UL resources can be allocated for each different beam link. This could limit the freedom associated with multi-beam links that are able to have different DL/UL directions, which could be independent, or partially independent, of each other.

Figure 6:
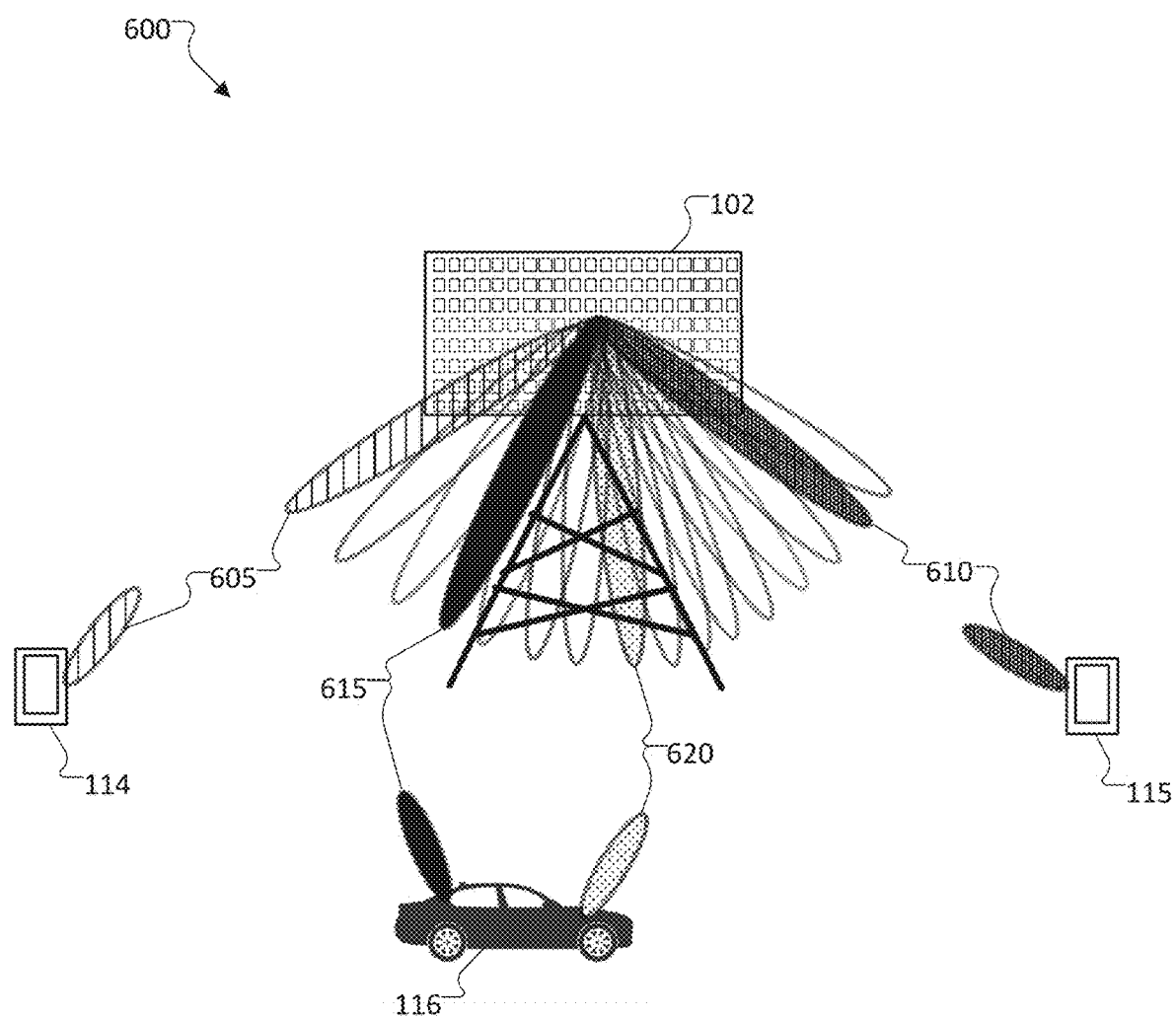
FIG. 6 illustrates a network diagram for communication to multiple terminals through different beams according to embodiments of the present disclosure.

FIG. 6 illustrates a network diagram for a communication to multiple terminals through different beams according to embodiments of the present disclosure. The embodiment of the network 600 shown in FIG. 6 is for illustration only. Other embodiments could be used without departing from the scope of the present disclosure.

In the example shown in FIG. 6, UE 116 is depicted as a mobile vehicle while UE 114 and UE 115 are illustrated as mobile devices. Additionally, UE 116, UE 115, and UE 114 are associated with gNB 102, which is able to provide DL/UL configuration information that could be different for different beams. Other embodiments could be used without departing from the scope of the present disclosure.

The gNB 102 and UE 114 use beam pair 605 for DL/UL operation between them. Here, the term "beam pair" can refer to DL TX/RX beams, UL TX/RX beams, or DL TX/RX and UL TX/RX beams, which can be indicated by gNB 102, for example, during multi-beam operation. If beam correspondence holds, DL TX/RX beams can be the same as UL RX/TX beams. In this case, the "beam pair" can be determined by either DL TX/RX beams or UL RX/TX beams. If beam correspondence does not hold, DL TX/RX beams can be different from UL RX/TX beams, and thus the "beam pair" can include DL TX/RX and UL TX/RX beams for DL and UL operations, respectively, for no beam correspondence cases. In one example, a beam pair can refer to a spatial reception filter that is/was used by the respective UE to receive a downlink reference signal such as an SSB or a CSI-RS that is indicated by the gNB 102, whereas a spatial transmission filter used by the gNB 102 to transmit the downlink reference signal can be transparent to the respective UE. In another example, a beam pair can refer to a spatial transmission filter that is/was used by the respective UE to transmit an uplink reference signal, such as an SRS, that is indicated by the gNB 102, whereas a spatial reception filter used by the gNB 102 to receive the uplink reference signal can be transparent to the respective UE. The gNB 102 and UE 115 use beam pair 610 for DL/UL operation between them. In addition, gNB 102 and UE 116 use beam pair 615 and beam pair 620 for DL/UL operation between them. Here, DL/UL operation can be differently performed according to DL/UL configuration information associated with each of the beam pairs 605, 610, 615, and 620, respectively. Therefore, for UE 116 in this example, different DL/UL operation can be performed according to DL/UL configuration associated with each of the beam pairs 615 and 620, respectively. In the example depicted in FIG. 6, the maximum number of configured beam pairs for UE is two, but it can be more than two beams in other scenarios.

To facilitate beam management for beam-specific DL and UL operations at UE (or gNB), self-interference measurement and reporting is essential since the self-interference can vary in channel environments, transmission powers, beam selections at panels, and so on. Therefore, mechanisms/procedures/components for self-interference measurement and reporting need to be introduced in the standard to measure/report signal qualities including self-interference so that gNB (or NW) can enhance beam management for UE capable of beam-specific DL and UL operations.

Figure 7:
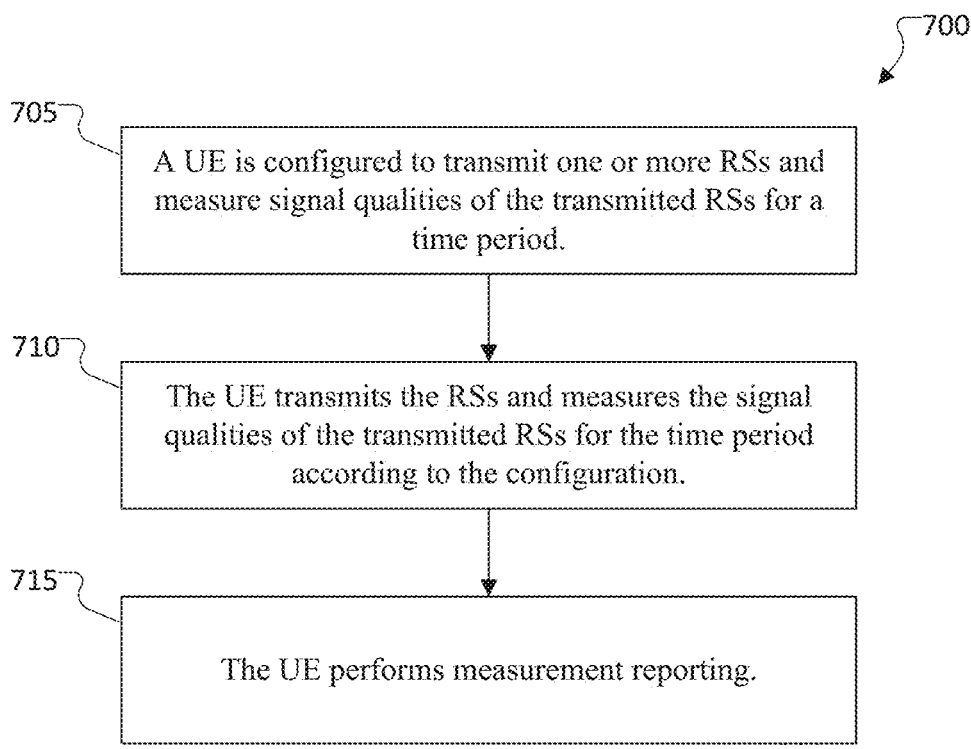
FIG. 7 illustrates a process for self-interference measurement and reporting according to embodiments of the present disclosure.

FIG. 7 illustrates a process for self-interference measurement and reporting according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a UE. Process 700 can be accomplished by, for example, UE 114, 115, and 116 in network 600.

At operation 705, the UE 116 is configured to transmit N RSs and measure signal qualities of the transmitted RSs for a time period. This configuration can be transmitted by NW/gNB via higher-layer (RRC) signaling. Optionally, the NW/gNB can signal/update the RS(s) dynamically via L1 or L2 DL control (i.e., PDCCH or MAC CE). The time-domain behavior of the self-interference measurement RS resources can be configured as aperiodic (AP), semi-persistent (SP), or periodic (P). In certain embodiments, the RS can be SRS, any other UL RS, or a new type of RS for self-interference measurement. In certain embodiments, the time period can be symbols, slots, subframes, and/or frames. In certain embodiments, when N>1, N RSs can be different (e.g., each of the RSs is associated with a different beam). In certain embodiments, when N>1, some RSs of the N RSs can be the same (e.g., a same beam) and the other remaining RSs can be different (e.g., different beams). In certain embodiments, all of the N RSs can be the same RS. When all of the N RS's are the same RS, the UE is configured to repeatedly send a same RS (e.g., associated with a same beam) N times and measure signal quality of the transmitted RS at each transmission time. In certain embodiments, N=1.

At operation 710, the UE 116 transmits the RSs and measures the signal qualities of the transmitted RSs according to the configuration. In one example, signal quality can be RSRP, RSRQ, SINR, and so forth.

At operation 715, the UE 116 performs measurement reporting. In certain embodiments, the measurement reporting can contain L smallest (or largest) RSRPs (i.e., smallest/largest self-interference) and/or corresponding RS indices (e.g., CRIs, SSB-RIs, sounding resource indicators (SRIs)), where 1≤L≤N. In certain embodiments, the measurement reporting can contain all RSRPs of the RSs. In certain embodiments, the UE 116 can perform measurement reporting based on triggering event evaluations. In certain embodiments, the UE 116 can be configured to report aperiodically, semi-persistently, or periodically.

Figure 8:
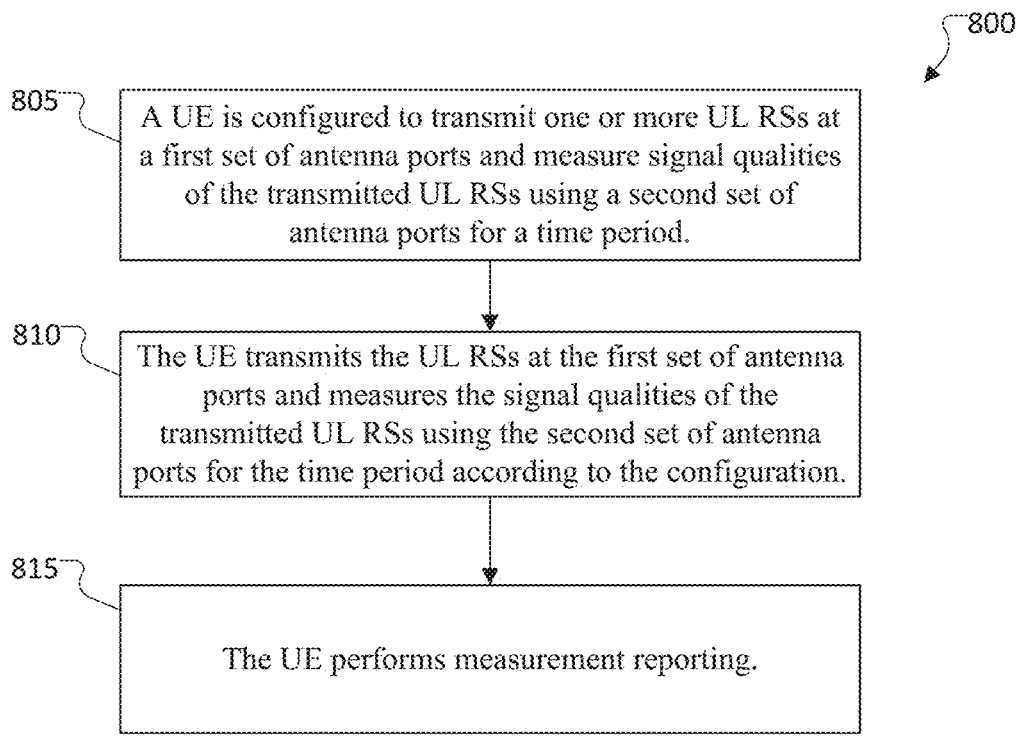
FIG. 8 illustrates another process for self-interference measurement and reporting according to embodiments of the present disclosure.

FIG. 8 illustrates another process for self-interference measurement and reporting according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a UE. Process 700 can be accomplished by, for example, UE 114, 115, and 116 in network 600.

At operation 805, UE 116 is configured to transmit N UL RSs at a first set of $M_1$ antenna ports and measure signal qualities of the UL RSs using a second set of $M_2$ antenna ports for a time period of T UL RS transmission times. This configuration can be transmitted by Network (NW)/gNB via higher-layer (RRC) signaling. Optionally, the NW/gNB can signal/update the UL RS(s) dynamically via L1 or L2 DL control (i.e., PDCCH or MAC Control Element (CE)). The time-domain behavior of the self-interference measurement RS resources can be configured as aperiodic (AP), semi-persistent (SP), or periodic (P). In one example, UL RS can be SRS or a new type of RS for self-interference measurement. In one example, N UL RSs are partitioned into K sets (e.g., SRS-ResourceSet, which can be linked with as a notion of antenna panel). In this case:

$$N = \sum_{k=1}^{K} N_k \qquad (1)$$

where $N_k$ is the number of UL RSs in set K, and each of the $N_k$ UL RSs in each set k can be associated with a UL TX beam. For example, if $K=M_1$, each UL RS set k can be associated with each port of the first set of $M_1$ antenna ports. In one example, a first set of $M_1$ antenna ports can be different from a second set of $M_2$ antenna ports. In another example, a first set of $M_1$ antenna ports and a second set of $M_2$ antenna ports are the same (for example, this case is relevant to full duplex case where each port can transmit and receive simultaneously). In one example, each port of the $M_2$ antenna ports can be configured to use a RX beam for each UL RS transmission. In one example, the RX beam at some or all ports are not explicitly configured. In another example, the RX beam at some or all ports can be configured, for example, using TCI states. In one example, T=N. In another example, T is independent of N. In another example, T>N. In another example, T=max{$N_1, \ldots, N_K$} when N UL RSs are partitioned into K sets, that is, as in Equation 1 above.

At operation 810, the UE 116 transmits the UL RSs at the first set of antenna ports and measures the signal qualities of the UL RSs using the second set of antenna ports for the time period according to the configuration. In one example, signal quality can be RSRP, RSRQ, SINR, and the like.

At operation 815, the UE 116 performs measurement reporting. In one example, measurement reporting can contain L smallest (or largest) RSRPs (i.e., self-interference) and/or corresponding RS indices (e.g., CRIs, SSB Resource Indicators (SSB-RIs), SRIs), where 1≤L≤N. In another example, measurement reporting can contain L smallest (or largest) RSRPs (i.e., self-interference) and/or corresponding RS indices (e.g., CRIs, SSB-RIs, SRIs) for each port of the $M_2$ antenna ports, where $1 \leq L \leq N$. In one example, measurement reporting can contain all RSRPs (or RSRQ, SINR, and so forth) of the RSs. In another example, measurement reporting can contain $L_k$ smallest (or largest) RSRPs (i.e., self-interference) and/or corresponding RS indices (e.g., SRIs when SRSs are used for RSs), where $1 \leq L_k \leq N_k$ for the case that N UL RSs are partitioned into K sets, i.e., as in Equation 1 above. In one example, the UE 116 can perform measurement reporting based on triggering event evaluations. In another example, the UE 116 can be configured to report aperiodically, semi-persistently, or periodically.

Figure 9:
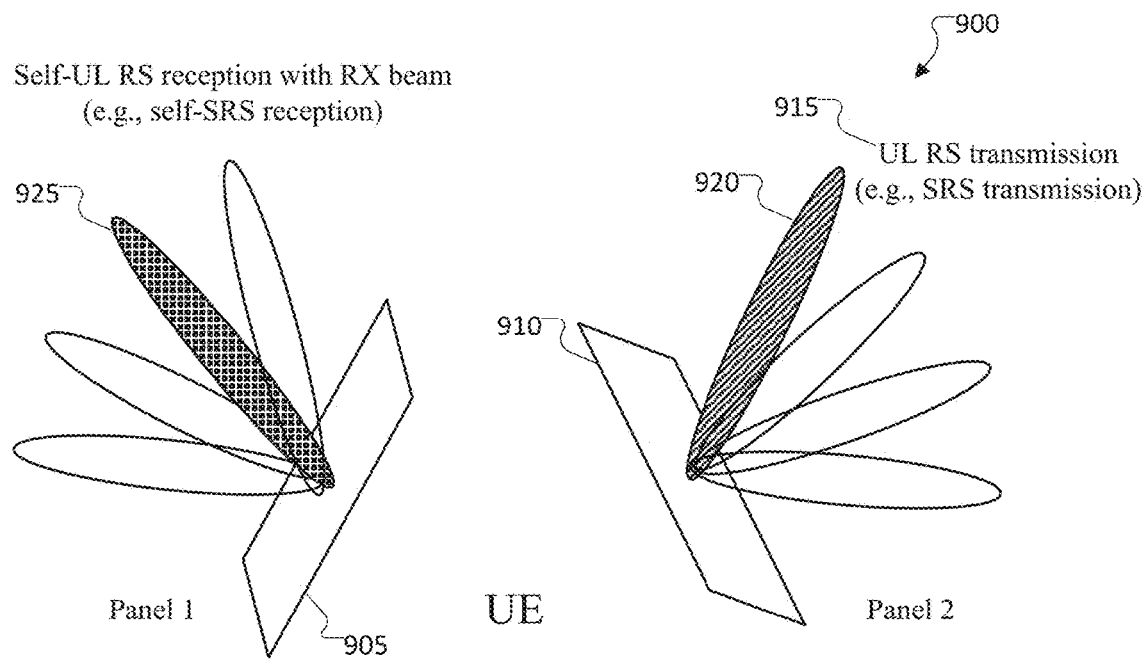
FIGS. 9, 10, 11, 12, and 13 illustrate UE operations according to embodiments of the present disclosure.

FIG. 9 illustrates a first UE operation according to embodiments of the present disclosure. The embodiment of the UE operation 900 shown in FIG. 9 is for illustration only. Other embodiments could be used without departing from the scope of the present disclosure.

In the example shown in FIG. 9, the UE 116 includes at least two panels including a first antenna panel 905 and a second antenna panel 910. Each of the panels 905, 910 is configured to communicate via a plurality of beams. Additionally, the number of the first set of $M_1$ antenna ports, the number of the second set of $M_2$ antenna ports, the number of transmissions N, and the time period T are the same. That is, $N = M_1 M_2 = T = 1$.

The UE 116 is configured to transmit an UL RS (such as SRS) 915 from the second antenna panel 910, which is associated with the first set of $M_1$ antenna port, and measure the UL RS at the first antenna panel 905, which is associated with the second set of $M_2$ antenna port, for a time period of a UL RS transmission time. The UL RS (e.g., SRS) 915 can be associated with an UL TX beam 920. A RX beam 925 for UL RS reception in the first antenna panel 905 can be configured explicitly or implicitly. For example, a TCI state can be used to indicate the RX beam 925 to measure the signal quality of the UL RS 915. Once UE 116 transmits the UL RS 915 and measures the UL RS 915 according to the configuration, the UE 116 performs measurement reporting. In one example, measurement reporting can contain the RSRP of the UL RS 915. In certain embodiments, the measurement reporting can contain a one-bit indicator, such as 0 or 1, which refers to the RSRP of the UL RS 915 as being large or not. In certain embodiments, the criterion to determine "large" is pre-configured or fixed. In certain embodiments, panel index information is included in the measurement report.

Figure 10:
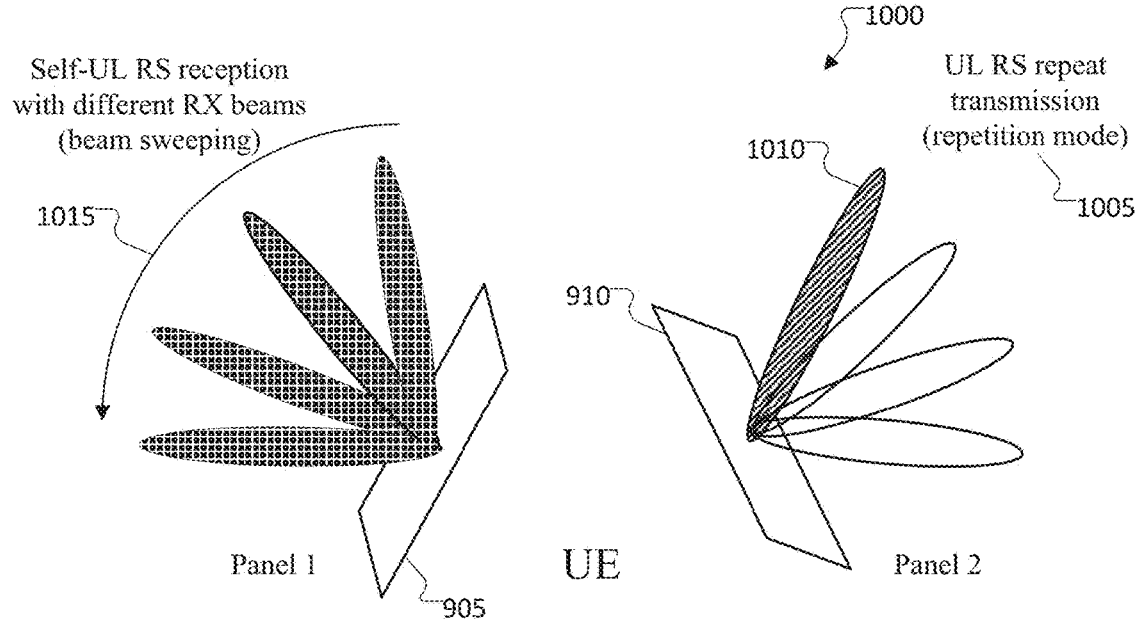

FIG. 10 illustrates a second UE operation according to embodiments of the present disclosure. The embodiment of the UE operation 1000 shown in FIG. 10 is for illustration only. Other embodiments could be used without departing from the scope of the present disclosure.

In the example shown in FIG. 10, the UE 116 includes at least two panels including a first antenna panel 905 and a second antenna panel 910. Each of the panels 905, 910 is configured to communicate via a plurality of beams. Additionally, the number of the first set of $M_1$ antenna ports matches the number of the second set of $M_2$ antenna ports, which the number of transmissions N and the time period T are greater than 1. That is, $M_1 = M_2 = 1$, and $N = T > 1$ and N UL RSs are the same (i.e., the N UL RSs are transmitted using a same UL TX beam).

In certain embodiments, the UE 116 is configured to repeatedly transmit a same UL RS N times from the second antenna panel 905, which is associated with the first set of $M_1$ antenna port, that is a repeat transmission mode ("repetition mode"). The UL RS (e.g., SRS) 1005 can be associated with a UL TX beam 1010. Also, the UE 116 is configured to measure each of the UL RSs at the first antenna panel 905, which is associated with the second set of $M_2$ antenna port, for each of T(=N) UL transmission times. For each UL RS 1005 transmission from the first set of $M_1$ antenna port (i.e., from the second antenna panel 910), the UE 116 can be configured to measure the signal quality of the UL RS at the second set of $M_2$ antenna port using a different RX beam, that is, using an RX beam-sweep measurement 1015, that is a beam-sweep measurement mode, as shown in the first antenna panel 905.

In certain embodiments, a set of different RX beams used at the second set of $M_2$ antenna port, namely, at the first antenna panel 905, to measure the UL RSs can be configured, fixed, or up to UE implementation issue. That is, the set of different RX beams at the first antenna panel 905 can be preconfigured, fixed, or dependent upon a particular UE implementation. In certain embodiments, the TCI states can be used to indicate RX beams to perform the RX beam-sweep measurement. Once the UE 116 transmits UL RSs 1005 and measures the UL RSs according to the configuration, the UE 116 performs measurement reporting. In certain embodiments, the measurement reporting can contain the L smallest (or largest) RSRPs (or RSRQ, SINR) of the UL RSs and/or corresponding RX beam indices (e.g., SSB-RIs, CRIs). In certain embodiments, the measurement reporting can contain only the smallest (or largest) RSRP among the N UL RS measurements. In one example, panel ID information is included in the measurement report.

Figure 11:
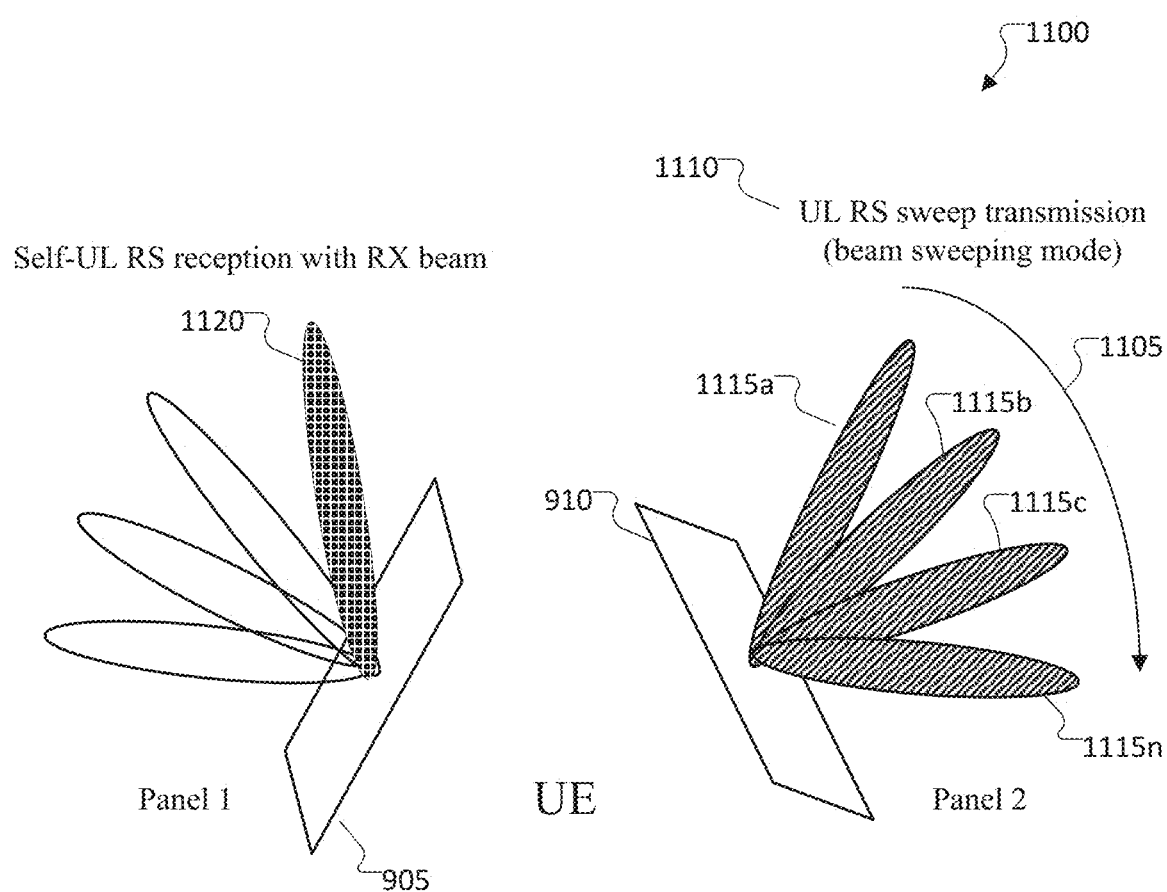

FIG. 11 illustrates a third UE operation according to embodiments of the present disclosure. The embodiment of the UE operation 1100 shown in FIG. 11 is for illustration only. Other embodiments could be used without departing from the scope of the present disclosure.

In the example shown in FIG. 11, the UE 116 includes at least two panels including a first antenna panel 905 and a second antenna panel 910. Each of the panels 905, 910 is configured to communicate via a plurality of beams. Additionally, the number of the first set of $M_1$ antenna ports matches the number of the second set of $M_2$ antenna ports, which the number of transmissions N and the time period T are greater than 1. That is, $M_1 = M_2 = 1$, and $N = T > 1$ and N UL RSs are different (i.e., the UL RSs are transmitted using a same UL TX beam).

In certain embodiments, the UE 116 is configured to transmit N different UL RSs from the second antenna panel 910, which is associated with the first set of $M_1$ antenna port, and each of the different UL RSs is transmitted in each UL transmission time, that is, a beam-sweep transmission mode 1105. Each of the different N UL RSs 1110 (e.g., SRSs) can be associated with a different UL TX beam 1115*a-n*. Also, the UE 116 is configured to measure each of the N UL RSs at the first antenna panel 905, which is associated with the second set of $M_2$ antenna port, for each of T(=N) UL transmission times. For each UL RS transmission from the first set of $M_1$ antenna port, namely the second antenna panel 910, the UE 116 can be configured to measure the signal quality of the UL RS 1110 at the second set of $M_2$ antenna port using a same RX beam 1120 (i.e., RX beam-repeat measurement), that is a beam-repeat measurement mode, as shown in the first antenna panel 905. In one example, a same RX beam 1120 used at the second set of $M_2$ antenna port, that is first antenna panel 905, to measure the UL RSs can be configured, fixed, or up to UE implementation issue. In one example, a TCI state can be used to indicate an RX beam to perform the RX beam-repeat measurement. Once the UE 116 transmits UL RSs 1110 and measures the UL RSs according to the configuration, UE 116 performs measurement reporting. In certain embodiments, the measurement reporting can contain L smallest (or largest) RSRPs (or RSRQ, SINR) of the UL RSs and/or corresponding UL RS indices (e.g., SRIs). In certain embodiments, the measurement reporting can contain only the smallest (or largest) RSRP among the N UL RS measurements. In certain embodiments, panel ID information is included in the measurement report.

Figure 12:
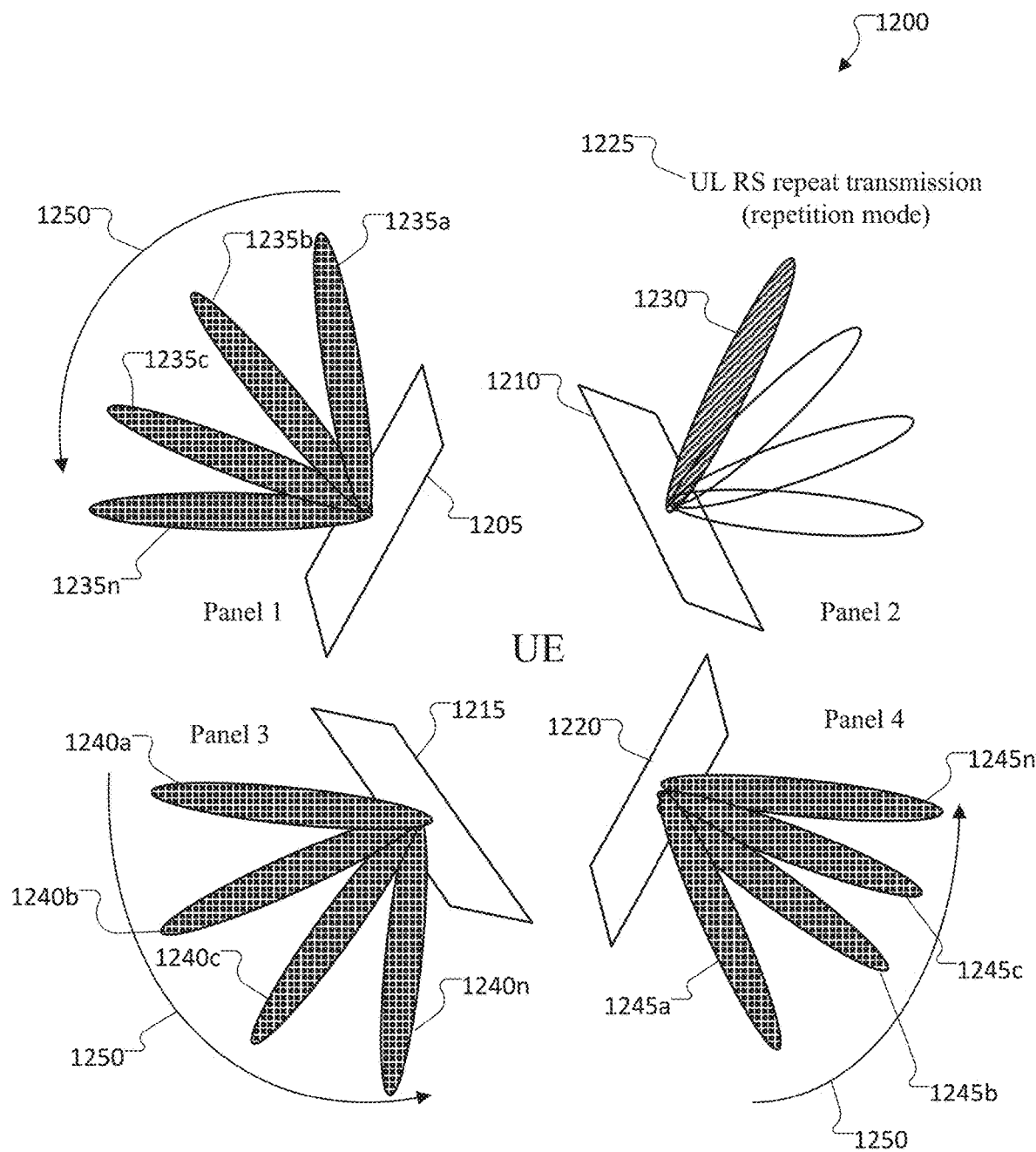

FIG. 12 illustrates a fourth UE operation according to embodiments of the present disclosure. The embodiment of the UE operation 1200 shown in FIG. 12 is for illustration only. Other embodiments could be used without departing from the scope of the present disclosure.

In the example shown in FIG. 12, the UE 116 includes at least four panels including a first antenna panel 1205, a second antenna panel 1210, a third panel 1215, and a fourth panel 1220. Each of the panels 1205, 1210, 1215, and 1220 is configured to communicate via a plurality of beams. Additionally, $M_1=1$, $M_2=3$, and $N=T>1$ and NUL RSs are the same.

In certain embodiments, the UE 116 is configured to repeatedly transmit a same UL RS N times from the second antenna panel 1210, which is associated with the first set of $M_1$ antenna port, that is, in a repeat transmission mode. The UL RS 1225 (e.g., SRS) can be associated with a UL TX beam 1230. Also, the UE 116 is configured to measure each of the N UL RSs at the first antenna panel 1205, the third antenna panel 1215, and the fourth antenna panel 1220, and 4, which are associated with the second set of $M_2$ antenna ports, for each of T(=N) UL transmission times. For each UL RS transmission from the first set of $M_1$ antenna port, namely, the second antenna panel 1210, the UE 116 can be configured to measure the signal quality of the UL RS 1225 at each port of the $M_2$ antenna ports using a different RX beam, e.g., RX beams 1235a-n of the first antenna panel 1205, 1240a-n of the third antenna panel 1215, and 1245a-n of the fourth antenna panel 1220. In certain embodiments, a set of different RX beams used at each port of the $M_2$ antenna ports, namely, the first antenna panel 1205, the third antenna panel 1215, and the fourth antenna panel 1220, to measure the UL RSs can be configured, fixed, or up to UE implementation issue. In certain embodiments, the TCI states can be used to indicate RX beams to perform the RX beam-sweep 1250 measurement. Once the UE 116 transmits UL RSs 1225 and measures the UL RSs 1225 according to the configuration, the UE 116 performs measurement reporting. In certain embodiments, the measurement reporting contains the L smallest (or largest) RSRPs (or RSRQ, SINR) of the UL RSs and/or corresponding RX beam indices (e.g., SSB-RIs, CRIs) and/or corresponding panel indices. In certain embodiments, the measurement reporting contains the L smallest (or largest) RSRPs (or RSRQ, SINR) of the UL RSs and/or corresponding RX beam indices (e.g., SSB-RIs, CRIs) for each port of the $M_2$ antenna ports, namely, the first antenna panel 1205, the third antenna panel 1215, and the fourth antenna panel 1220. In certain embodiments, the panel ID information is included in the measurement report.

Figure 13:
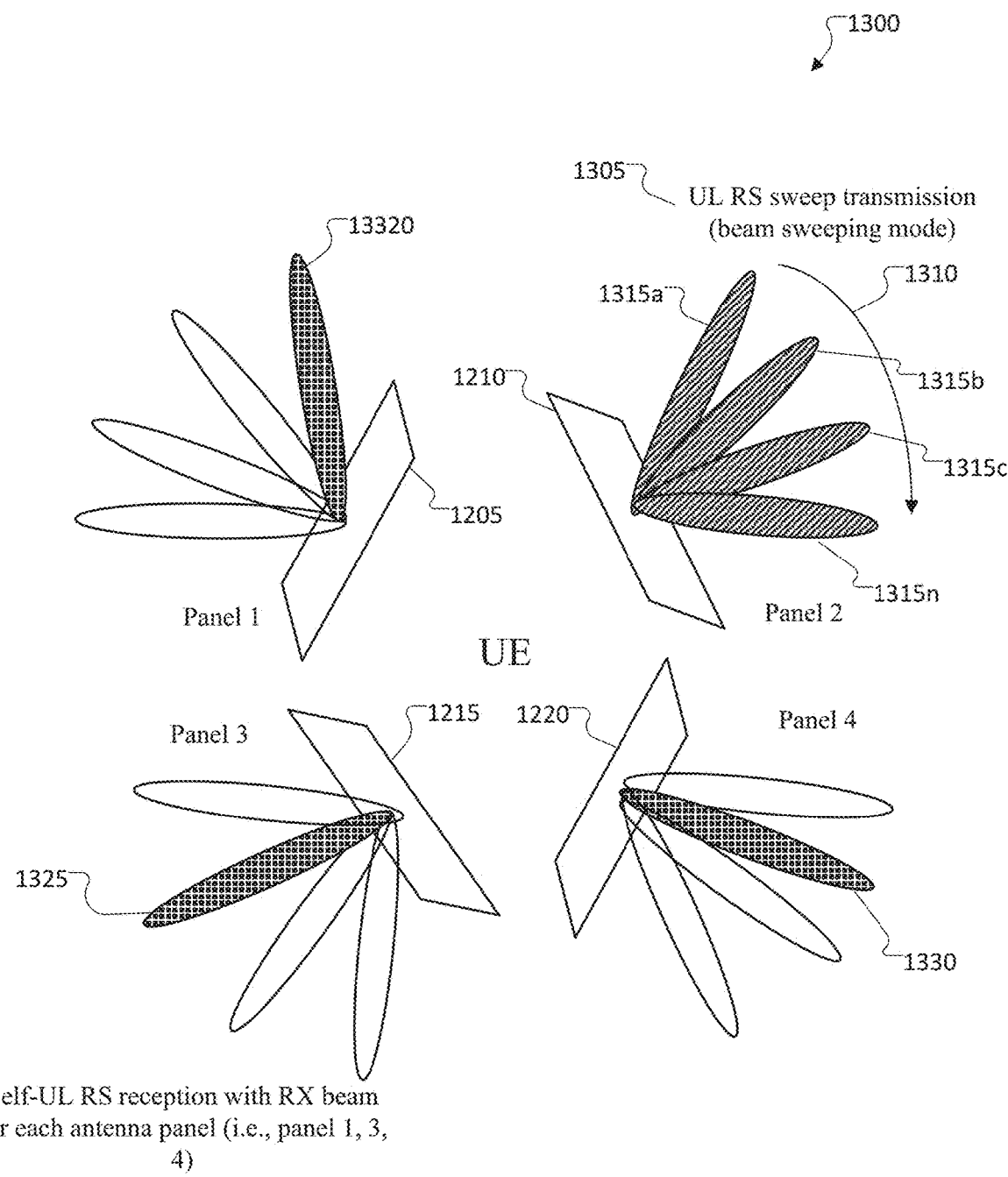

FIG. 13 illustrates a fifth UE operation according to embodiments of the present disclosure. The embodiment of the UE operation 1300 shown in FIG. 13 is for illustration only. Other embodiments could be used without departing from the scope of the present disclosure.

In the example shown in FIG. 13, the UE 116 includes at least four panels including a first antenna panel 1205, a second antenna panel 1210, a third panel 1215, and a fourth panel 1220. Each of the panels 1205, 1210, 1215, and 1220 is configured to communicate via a plurality of beams. Additionally, $M_1=1$, $M_2=3$, and $N=T>1$ and N UL RSs are different, that is, the UL RSs are transmitted using different UL TX beams.

In certain embodiments, the UE 116 is configured to transmit N different UL RSs 1305 from the second antenna panel 1210, which is associated with the first set of $M_1$ antenna port, and each of the different UL RSs 1305 is transmitted in UL transmission time, that is a beam-sweep 1310 transmission mode. Here, each of the different N UL RSs (e.g., SRSs) can be associated with a different UL TX beam, such as beams 1315a-n of the second antenna panel 1210. Also, the UE 116 is configured to measure each of the N UL RSs at the first antenna panel 1205, the third antenna panel 1215, and the fourth antenna panel 1220, which are associated with the second set of $M_2$ antenna ports, for each of T(=N) UL transmission times. For each UL RS transmission from the first set of $M_1$ antenna port, namely, the second antenna panel 1210, the UE 116 can be configured to measure the signal quality of the UL RS 1305 at each port of the $M_2$ antenna ports using a same RX beam, namely a RX beam-repeat measurement mode, that is, RX beam 1320 of the first antenna panel 1205, RX beam 1325 of the third antenna panel 1215, and RX beam 1330 of the fourth antenna panel 1220. In certain embodiments, a same RX beam (that is, the RX beams 1320, 1325, and 1330) used at each of the $M_2$ antenna port, that is, the first antenna panel 1205, the third antenna panel 1215, and the fourth antenna panel 1220, to measure the UL RSs can be configured, fixed, or up to UE implementation issue. In certain embodiments, a TCI state can be used to indicate a RX beam to perform the RX beam-repeat measurement for each port of the $M_2$ antenna port. Once the UE 116 transmits UL RSs 1305 and measures the UL RSs according to the configuration, the UE 116 performs measurement reporting. In certain embodiments, the measurement reporting contains L smallest (or largest) RSRPs (or RSRQ, SINR) of the UL RSs and/or corresponding UL RS indices (e.g., SRIs), and/or corresponding panel indices. In certain embodiments, the measurement reporting contains L smallest (or largest) RSRPs (or RSRQ, SINR) of the UL RSs and/or corresponding UL RS indices (e.g., SRIs) for each port of the $M_2$ antenna ports, namely, the first antenna panel 1205, the third antenna panel 1215, and the fourth antenna panel 1220. In certain embodiments, measurement reporting contains only the smallest (or largest) RSRP among the N UL RS measurements. In certain, panel ID information is included in the measurement report.

Figure 14:
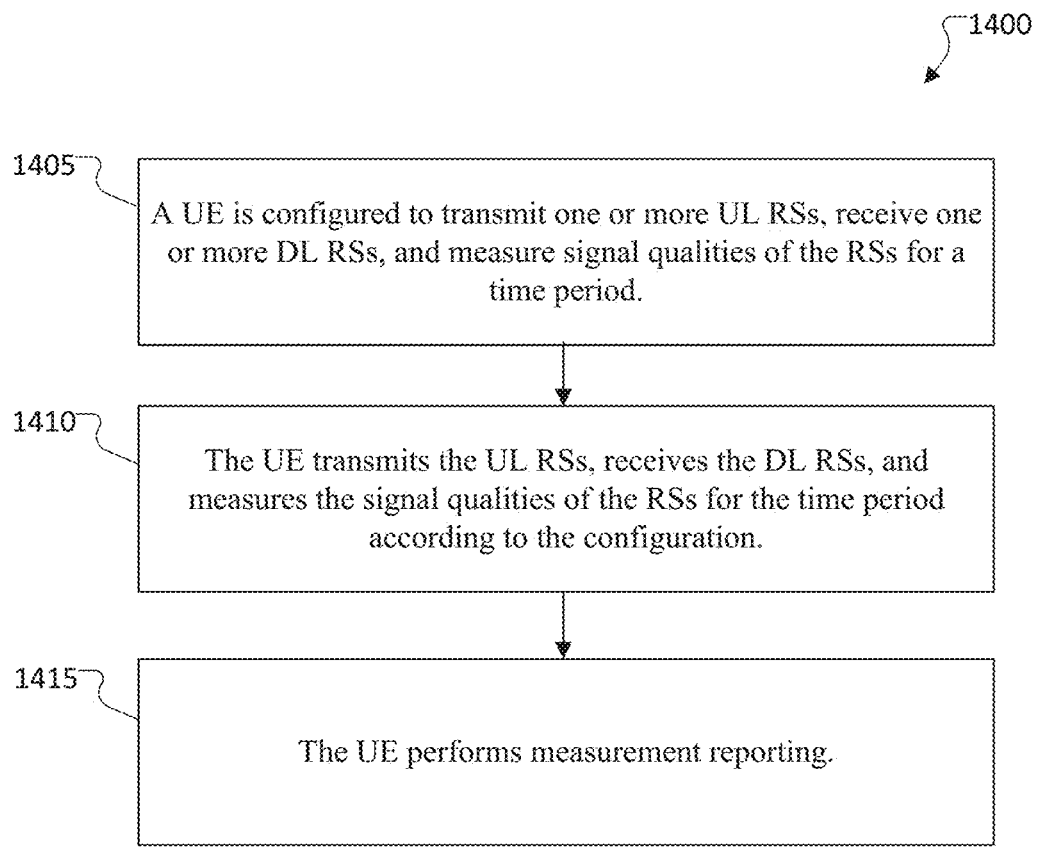
FIG. 14 illustrates a process for self-interference and DL RS measurement and reporting according to embodiments of the present disclosure.

FIG. 14 illustrates a process for self-interference and DL RS measurement and reporting according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a UE. Process 1400 can be accomplished by, for example, UE 114, 115, and 116 in network 600.

At operation 1405, UE 116 is configured to transmit N UL RSs, receive P DL RSs, and measure signal qualities of the RSs for a time period. This configuration can be transmitted by NW/gNB via higher-layer (RRC) signaling. Optionally, the NW/gNB can signal/update the RS(s) dynamically via L1 or L2 DL control (i.e., PDCCH or MAC CE). The time-domain behavior of the self-interference and DL measurement RS resources can be configured as aperiodic (AP), semi-persistent (SP), or periodic (P). In certain embodiments, the UL RS can be an SRS, or a new type of RS for self-interference measurement. For example, the DL-RS like (for example, the CSI-RS-like) UL RS can be defined as a new type of RS for SINR measurement including self-interference. For example, the UE 116 can measure SINR including self-interference for DL CSI-RS while CSI-RS-like UL RS is transmitting. In certain embodiments, DL RS can be SSB, CSI-RS, or DMRS. In certain embodiments, the time period can be symbols, slots, subframes, and/or frames. For example, when N>1, N UL RSs can be different (e.g., each of the UL RSs is associated with a different beam). In another example, when N>1, some of the N UL RSs can be the same (e.g., a same beam) and the other remaining UL RSs can be different (e.g., different beams). In another example, all of the N UL RSs can be the same RS. In this case, the UE 116 can be configured to repeatedly transmit a same UL RS (e.g., associated with a same beam) N times and measure signal quality of the transmitted UL RS each transmission time. In another example, N=1. In another example, when P>1, P DL RSs can be different (e.g., each of the DL RSs is associated a different beam). In another example, when P>1, some of the P DL RSs can be the same (e.g., a same beam) and the other remaining DL RSs can be different (e.g., different beams). In another example, all of the P UL RSs can be the same RS. In this case, the UE 116 can be configured to repeatedly receive a same DL RS (e.g., associated with a same beam) P times and measure signal quality of the DL RS each transmission time. In another example, P=1.

At operation 1410, the UE 116 transmits the UL RSs, receives the DL RSs, and measures the signal qualities of the RSs according to the configuration. In certain embodiments, the signal quality can be RSRP, RSRQ, SINR, and the like. In certain embodiments, the UE 116 performs to successive interference cancellation to measure UL RS self-interference and DL RS signal qualities.

At operation 1415, the UE 116 performs measurement reporting. In certain embodiments, the measurement reporting contains L smallest (or largest) RSRPs, RSRQs, or SINRs (i.e., smallest/largest self-interference and/or DL RS signal quality) and/or corresponding RS indices (e.g., CRIs, SSB-RIs, SRIs), where 1≤L≤N. In certain embodiments, the measurement reporting contains all RSRPs of the RSs. In certain embodiments, the UE 116 performs measurement reporting based on triggering event evaluations. In certain embodiments, the UE 116 is configured to report aperiodically, semi-persistently, or periodically.

Figure 15:
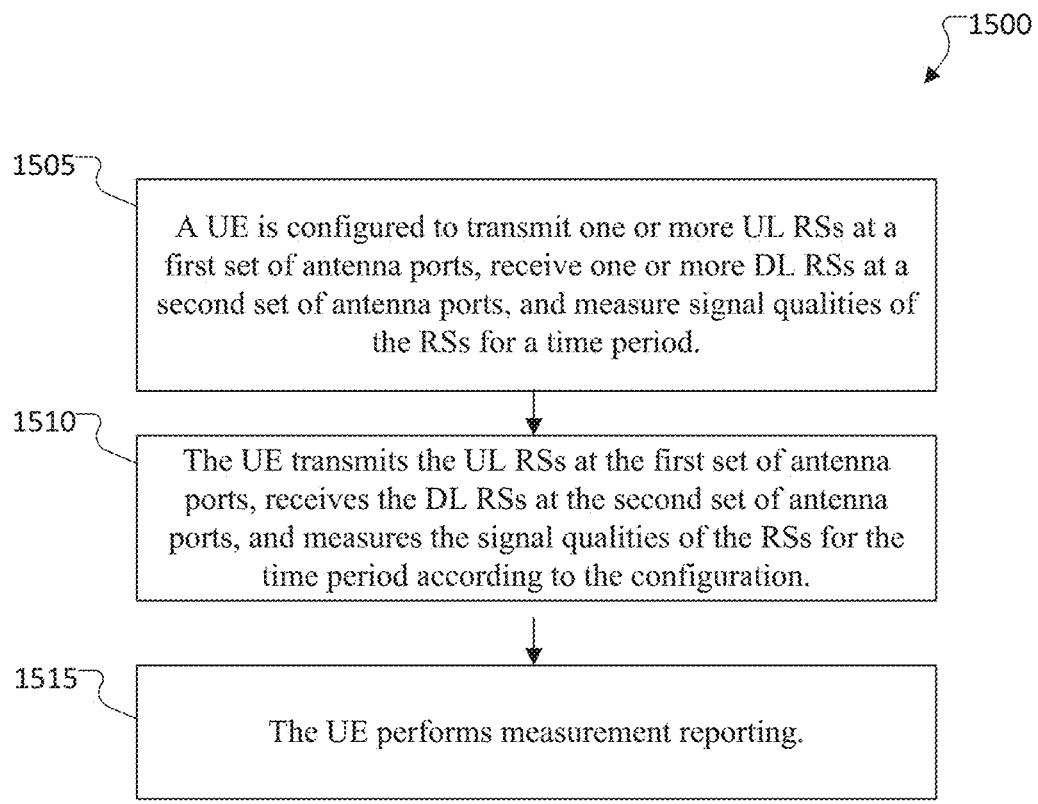
FIG. 15 illustrates another process for self-interference and DL RS measurement and reporting according to embodiments of the present disclosure.

FIG. 15 illustrates another process for self-interference and DL RS measurement and reporting according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a UE. Process 1400 can be accomplished by, for example, UE 114, 115, and 116 in network 600.

At operation 1505, the UE 116 is configured to transmit N UL RSs at a first set of $M_1$ antenna ports, receive P DL RSs at a second set of antenna ports, and measure signal qualities of the RSs for a time period of T UL RS transmission times. This configuration can be transmitted by NW/gNB via higher-layer (RRC) signaling. Optionally, the NW/gNB can signal/update the RS(s) dynamically via L1 or L2 DL control (i.e., PDCCH or MAC CE). The time-domain behavior of the self-interference and DL measurement RS resources can be configured as aperiodic (AP), semi-persistent (SP), or periodic (P). In certain embodiments, the UL RS can be an SRS or a new type of RS for self-interference measurement. For example, DL-RS like (such as, CSI-RS-like) UL RS can be defined as a new type of RS for SINR measurement including self-interference. For example, the UE 116 can measure SINR including self-interference for DL CSI-RS at a first set of antenna ports while CSI-RS-like UL RS is transmitting at a second set of antenna ports. In certain embodiments, the DL RS can be SSB, CSI-RS, or DMRS. In certain embodiments, N UL RSs are partitioned into K sets (e.g., SRS-ResourceSet, which can be linked with a notion of antenna panel). In this case, $$N = \sum_{k=1}^{K} N_k \quad (1)$$

where $N_k$ is the number of UL RSs in set K, and each of the $N_k$ UL RSs in each set k can be associated with a UL TX beam. For example, if $K=M_1$, each UL RS set k can be associated with each port of the first set of $M_1$ antenna ports. In certain embodiments, P DL RSs are partitioned into S sets (e.g., CSI-RS-ResourceSet, which can be linked with a notion of antenna panel). In this case, $$P = \sum_{s=1}^{S} P_s \quad (2)$$

where $P_S$ is the number of DL RSs in set S, and each of the $P_S$ DL RSs in each set s can be associated with a DL RX beam. For example, if $S=M_2$, each DL RS set s can be associated with each port of the first set of $M_2$ antenna ports. In one example, a first set of $M_1$ antenna ports can be different from a second set of $M_2$ antenna ports. In another example, a first set of $M_1$ antenna ports and a second set of $M_2$ antenna ports are the same; that is, this case is relevant to full duplex case where each port can transmit and receive simultaneously. In one example, $$T = \max\{N,P\} \quad (3).$$

In another example, T is independent of N, P. In another example, $$T = \max\{N_1, \ldots, N_K, P_1, \ldots, P_S\} \quad (4)$$

when N UL RSs are partitioned into K sets, that is as in Equation 1 above and P DL RSs are partitioned into S sets, that is:

$$P = \sum_{s=1}^{S} N_s. \quad (5)$$

At operation 1510, the UE 116 transmits the UL RSs at the first set of antenna ports, receives the DL RSs at the second set of antenna ports, and measures the signal qualities of the RSs for the time period according to the configuration. In certain embodiments, the signal quality can be RSRP, RSRQ, SINR, and the like. In certain embodiments, the UE 116 performs to successive interference cancellation to measure UL RS self-interference and DL RS signal qualities, respectively. In certain embodiments, the UE 116 computes SINR including self-interference measurement, which can be configured to report.

At operation 1515, the UE 116 performs measurement reporting. In certain embodiments, the measurement reporting contains the L smallest (or largest) RSRPs of the UL RSs (e.g., self-interference) and/or G largest (or smallest) RSRPs of the DL RSs (e.g., DL RS signal quality) and/or corresponding RS indices (e.g., CRIs, SSB-RIs, SRIs), where $1 \leq L \leq N$ and $1 \leq G \leq P$. In certain embodiments, the measurement reporting contains the above embodiment for each port of the $M_2$ antenna ports. In certain embodiments, the measurement reporting contains the L largest (or smallest) SINRs, which can be computed when measuring the DL RSs while transmitting the UL RSs, and/or corresponding RS indices (e.g., CRIs, SSB-RIs, SRIs), where $1 \leq L \leq min(N, P)$. In certain embodiments, the measurement reporting can contain the above example for each port of the $M_2$ antenna ports. In certain embodiments, the measurement reporting can contain all RSRPs (or RSRQ, SINR, and so on) of the RSs. In certain embodiments, the measurement reporting contains the $L_k$ smallest (or largest) RSRPs (i.e., self-interference) of the UL RSs and/or $G_S$ largest (or smallest) RSRPs of the DL RSs and/or corresponding RS indices (e.g., CRIs, SSB-RIs, SRIs), where $1 \leq L_k \leq N_k$ for the case that N UL RSs are partitioned into K sets, i.e., as in Equation 1 above and $1 \leq G_S \leq P_S$ for the case that P DL RSs are partitioned into S sets, i.e. as in Equation 2 above, respectively. In certain embodiments, the UE 116 performs measurement reporting based on triggering event evaluations. In certain embodiments, the UE 116 is configured to report aperiodically, semi-persistently, or periodically.

Figure 16:
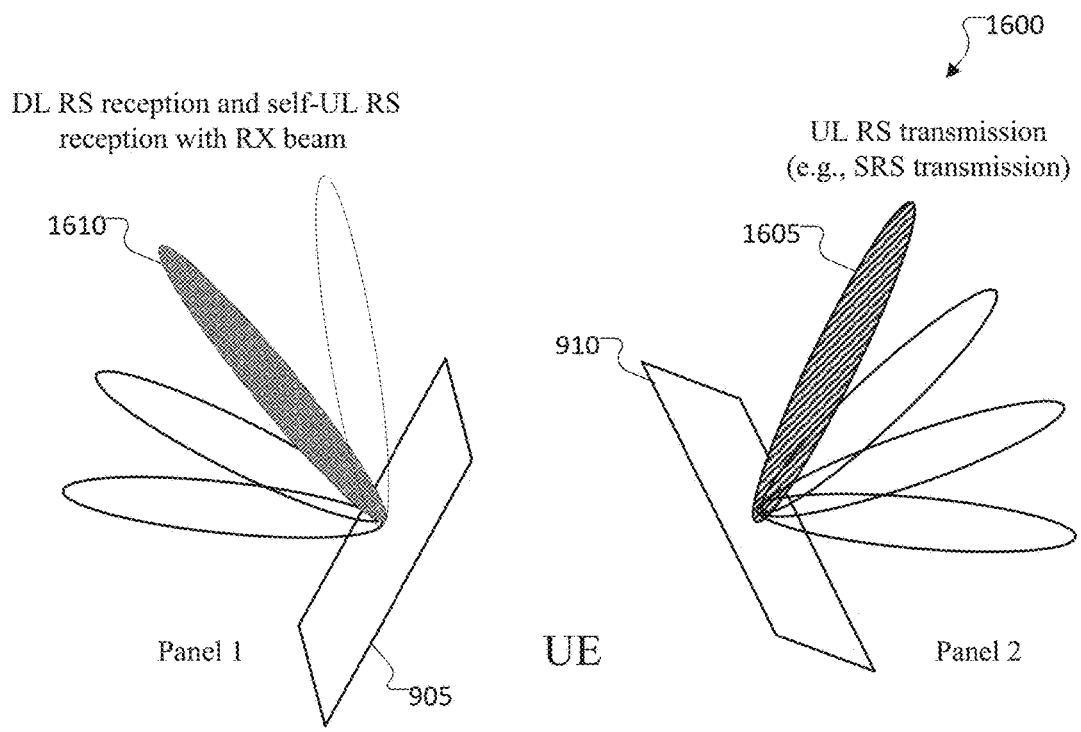
FIG. 16 illustrates an example operation of a UE according to embodiments of the present disclosure.

FIG. 16 illustrates an example operation of a UE according to embodiments of the present disclosure. The embodiment of the UE operation 1600 shown in FIG. 16 is for illustration only. Other embodiments could be used without departing from the scope of the present disclosure.

In the example shown in FIG. 16, $N=P=M_1=M_2=T$. In certain embodiments, the UE 116 is configured to transmit an UL RS (such as SRS) from the second antenna panel 910, which is associated with the first set of $M_1$ antenna port, and receive a DL RS at the first antenna panel 905, which is associated with the second set of $M_2$ antenna port, and measure the RSs for a time period. The UL RS (e.g., SRS) can be associated with a UL TX beam 1605. In certain embodiments, the UE 116 can be configured to measure signal quality of DL RS via an RX beam 1610 while transmitting the UL RS. In certain embodiments, the UE 116 can be configured to measure both signal qualities of DL RS and UL RS. In this case, UE 116 can perform successive interference cancellation to compute the signal qualities. Once the UE 116 transmits the UL RS, receives the DL RS, and measures the RS(s) according to the configuration, the UE 116 performs measurement reporting. In certain embodiments, the measurement reporting contains the RSRPs/RSRQs/SINRs of the DL RS and UL RS. In certain embodiments, the measurement reporting contains a one-bit indicator, that is, 0 or 1, which refers to the RSRPs/RSRQs/SINRs of the DL RS and UL RS large or not. In this case, the criterion to determine "large" is pre-configured or fixed. In certain embodiments, panel index information is included in the measurements reporting.

Figure 17:
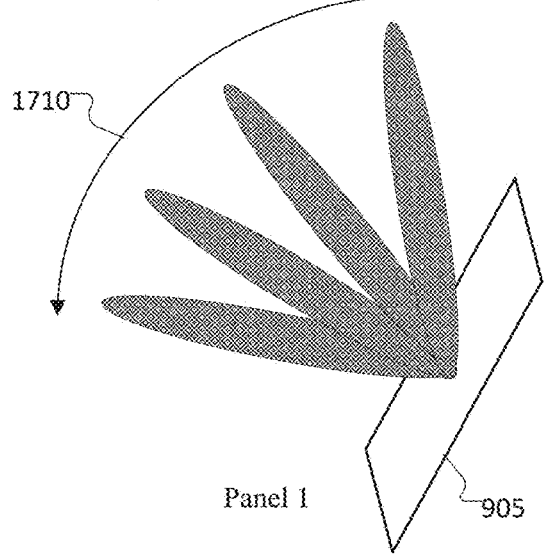
FIG. 17 illustrates an example operation of a UE according to embodiments of the present disclosure.
Figure 17:
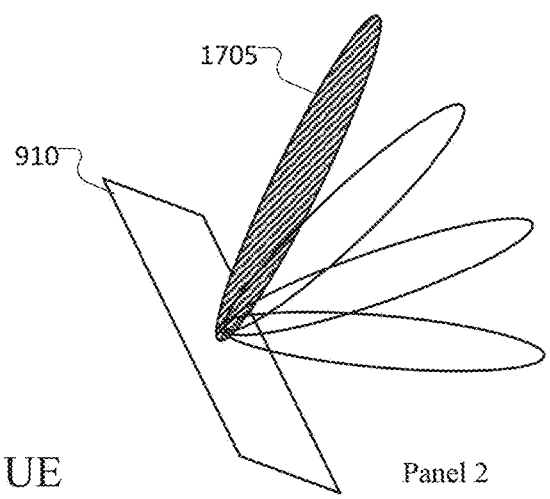

FIG. 17 illustrates an example operation of a UE according to embodiments of the present disclosure. The embodiment of the UE operation 1700 shown in FIG. 17 is for illustration only. Other embodiments could be used without departing from the scope of the present disclosure.

In the example shown in FIG. 17, when $M_1=M_2=1$, $N=P=T>1$ and N UL RSs are the same (i.e., the N UL RSs are transmitted using a same UL TX beam), and P DL RSs are received with different DL RX beams. In certain embodiments, the UE 116 is configured to repeatedly transmit the same UL RS N times from the second antenna panel 910, which is associated with the first set of $M_1$ antenna port, namely in a repeat transmission mode. The UL RS (e.g., SRS) can be associated with an UL TX beam 1705. Also, the UE 116 is configured to receive each of P DL RSs at the first antenna panel 905, which is associated with the second set of $M_2$ antenna port, for each of $T(=N=P)$ RS transmission times. For each UL RS transmission from the first set of $M_1$ antenna port, i.e., the second antenna panel 910, the UE 116 can be configured to measure signal quality of each DL RS (and/or the signal quality of each UL RS) at the second set of $M_2$ antenna port using a different DL RX beam, namely, via a beam sweep 1710 measurement. Once the UE 116 transmits UL RSs, receive DL RSs, and measures signal qualities of the RSs according to the configuration, the UE 116 performs measurement reporting. In certain embodiments, the measurement reporting contains the L smallest (or largest) RSRPs (or RSRQ, SINR) of the RSs and/or corresponding RS beam indices (e.g., SSB-RIs, CRIs). In certain embodiments, the measurement reporting contains only the smallest (or largest) RSRP among the N(=P) RS measurements. In certain embodiments, the measurement reporting includes panel ID information.

Figure 18:
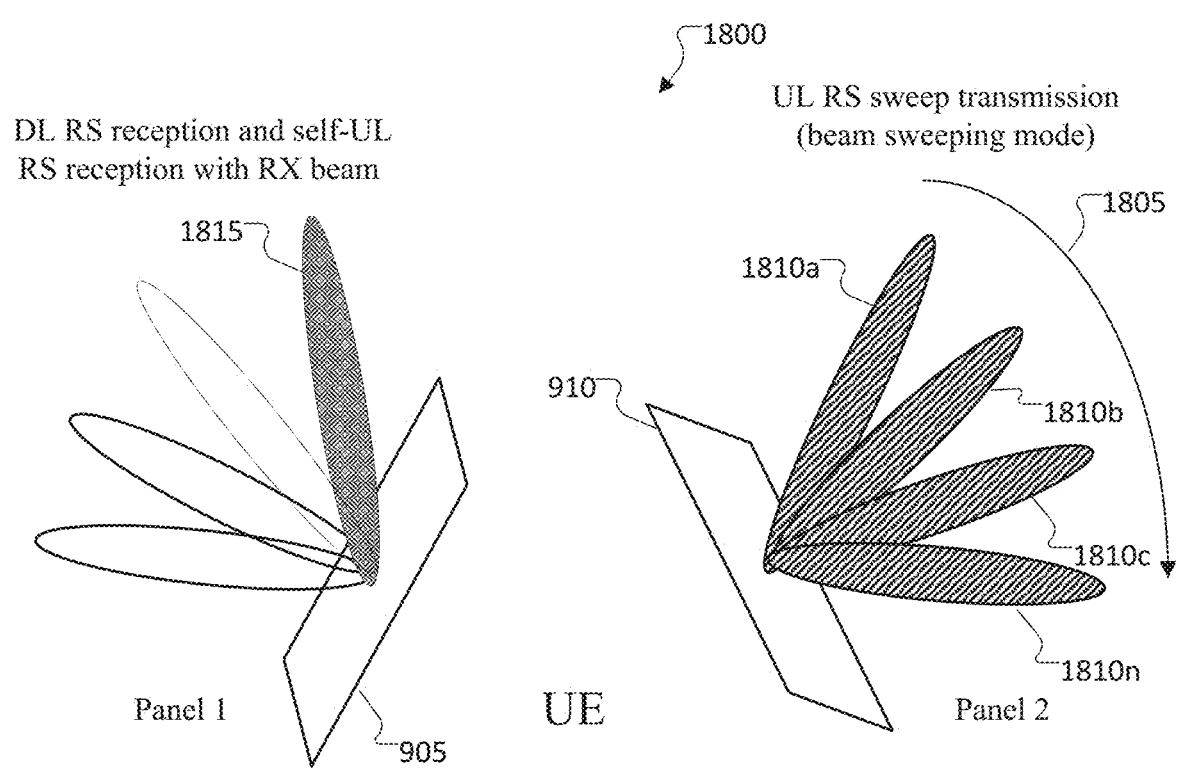
FIGS. 18, 19, and 20 illustrate example operations of a UE according to embodiments of the present disclosure.

FIG. 18 illustrates an example operation of a UE according to embodiments of the present disclosure. The embodiment of the UE operation 1800 shown in FIG. 18 is for illustration only. Other embodiments could be used without departing from the scope of the present disclosure.

In the example shown in FIG. 18, when $M_1=M_2=1$, $N=T>1$ and N UL RSs are different (i.e., the UL RSs are transmitted using different UL TX beams), and P DL RSs are received with a same DL RX beam. In certain embodiments, the UE 116 is configured to transmit N different UL RSs from the second antenna panel 905, which is associated with the first set of $M_1$ antenna port, and each of the different UL RSs is transmitted in each UL transmission time, that is, a beam-sweep transmission mode 1805. Here, each of the different N UL RSs (e.g., SRSs) can be associated with a different UL TX beam 1810*a-n*. Also, the UE 116 is configured to receive each of P DL RSs at the first antenna panel 905, which is associated with the second set of $M_2$ antenna port, for each of $T(=N=P)$ RS transmission times. For each UL RS transmission from the first set of $M_1$ antenna port, namely, the second antenna panel 910, the UE 116 can be configured to measure signal quality of each DL RS (and/or signal quality of each UL RS) at the second set of $M_2$ antenna port using a same DL RX beam 1815 (i.e., DL RX beam-repeat measurement), that is a beam-report measurement mode. Once the UE 116 transmits UL RSs, receives DL RSs, and measures signal qualities of the RSs according to the configuration, the UE 116 performs measurement reporting. In certain embodiments, the measurement reporting contains the L smallest (or largest) RSRPs (or RSRQ, SINR) of the RSs and/or corresponding UL RS indices (e.g., SRIs). In certain embodiments, the measurement reporting contains only the smallest (or largest) RSRP among the N(=P) RS measurements. In certain embodiments, the measurement reporting contains panel ID.

Figure 19:
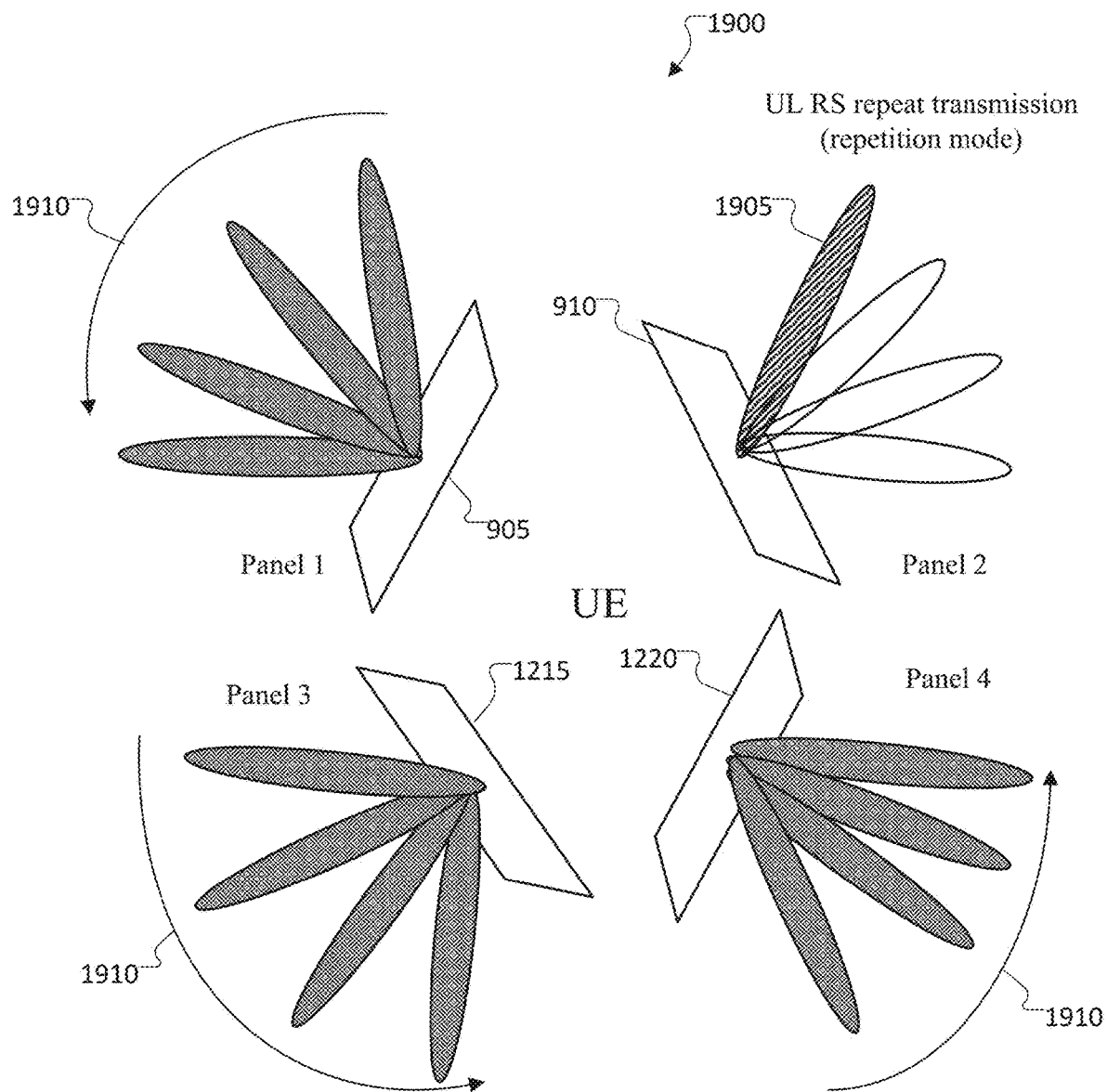

FIG. 19 illustrates another example operation of a UE according to embodiments of the present disclosure. The embodiment of the UE operation 1900 shown in FIG. 19 is for illustration only. Other embodiments could be used without departing from the scope of the present disclosure.

In the example shown in FIG. 19, when $M_1=1$, $M_2=3$, $N=P=T>1$ and N UL RSs are the same (i.e., the UL RSs are transmitted using a same UL TX beam), and P DL RSs are received with different DL RX beams at each port (panel) of $M_2$ antenna ports. In certain embodiments, the UE 116 is configured to repeatedly transmit a same UL RS N times from the second antenna panel 910, which is associated with the first set of $M_1$ antenna port, that is, in a repeat transmission mode. The UL RS (e.g., SRS) can be associated with a UL TX beam 1905. Also, the UE 116 is configured to receive each of P DL RSs at the first antenna panel 905, third antenna panel 1215, and fourth antenna panel 1220, which are associated with the second set of $M_2$ antenna ports, for each of $T(=N=P)$ RS transmission times. For each UL RS transmission from the first set of $M_1$ antenna port, that is, the second antenna panel 910, the UE 116 can be configured to measure signal quality of each DL RS (and/or signal quality of each UL RS) at each port of the $M_2$ antenna ports using a different DL RX beam, that is, a DL RX beam-sweep measurement 1910, that is a beam-sweep measurement mode. Once the UE 116 transmits UL RSs, receives DL RSs, and measures the signal qualities of the RSs according to the configuration, the UE 116 performs measurement reporting. In certain embodiments, the measurement reporting contains the L smallest (or largest) RSRPs (or RSRQ, SINR) of the RSs and/or corresponding RS (or RX beam) indices (e.g., SSB-RIs, CRIs) and/or corresponding panel indices. In certain embodiments, the measurement reporting contains the L smallest (or largest) RSRPs (or RSRQ, SINR) of the RSs and/or corresponding RS (or RX beam) indices (e.g., SSB-RIs, CRIs) for each port of the $M_2$ antenna ports (i.e., Panels 1, 3, and 4). In certain embodiments, the measurement reporting contains panel ID information.

Figure 20:
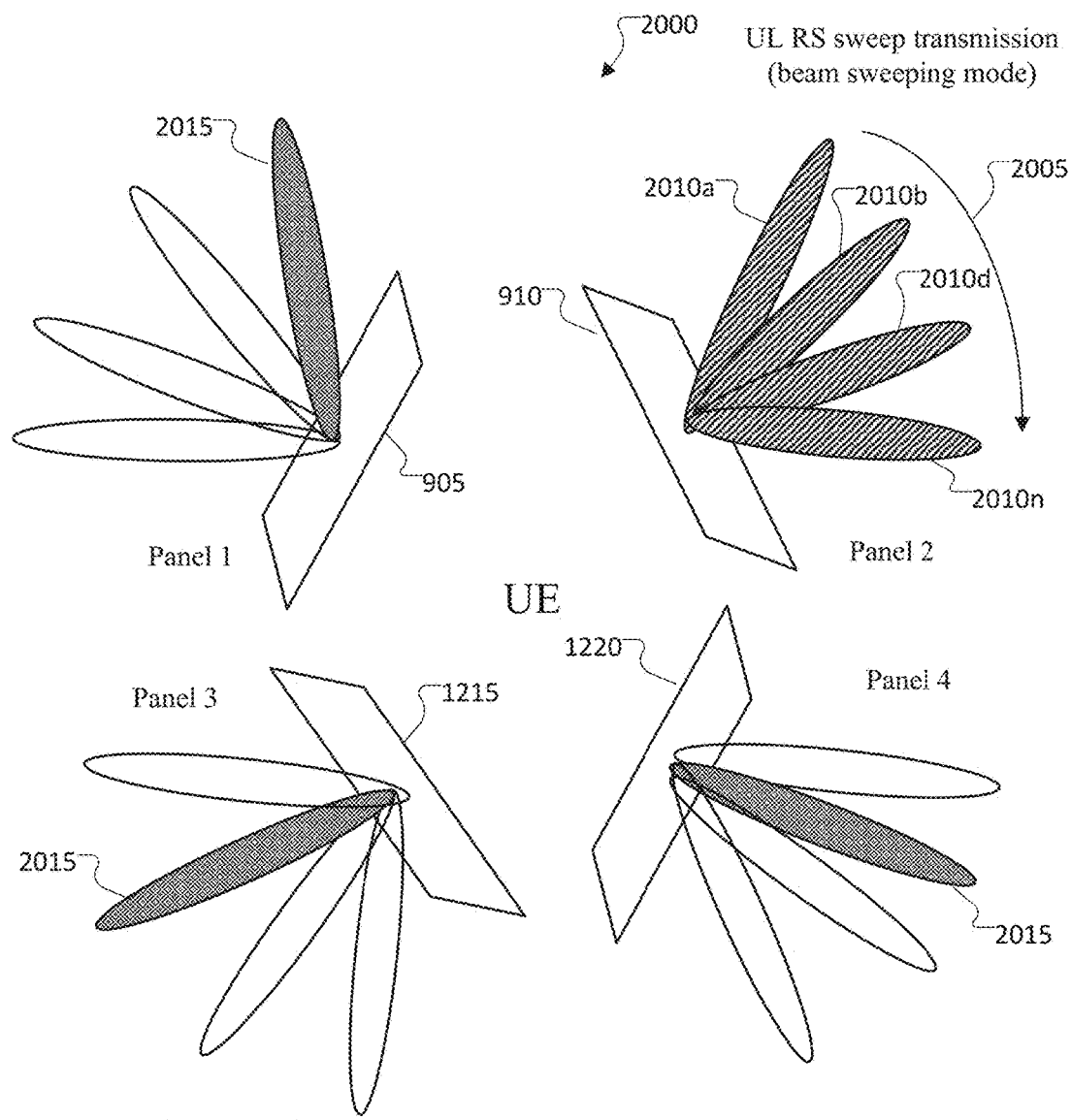

FIG. 20 illustrates another example operation of a UE according to embodiments of the present disclosure. The embodiment of the UE operation 2000 shown in FIG. 20 is for illustration only. Other embodiments could be used without departing from the scope of the present disclosure.

In the example shown in FIG. 20, when $M_1=1$, $M_2=3$, $N=P=T>1$ and N UL RSs are different (i.e., the UL RSs are transmitted using different UL TX beams), and P DL RSs are received with a same DL RX beam at each port (panel) of $M_2$ antenna ports. In certain embodiments, the UE 116 is configured to transmit N different UL RSs from the second antenna panel 910, which is associated with the first set of $M_1$ antenna port, and each of the different UL RSs is transmitted in UL transmission time, that is, using a beam-sweep transmission mode 2005. In the example shown in FIG. 20, each of the different N UL RSs (e.g., SRSs) can be associated with a different UL TX beam 2010a-n. Also, the UE 116 is configured to receive each of P DL RSs at the first antenna panel 905, third antenna panel 1215, and fourth antenna panel 1220, which are associated with the second set of $M_2$ antenna ports, for each of $T(=N=P)$ RS transmission times. For each UL RS transmission from the first set of $M_1$ antenna port, that is, the second antenna panel 910, the UE 116 can be configured to measure signal quality of the DL RS (and/or signal quality of the UL RS) at each port of the $M_2$ antenna ports using a same DL RX beam 2015. Once the UE 116 transmits UL RSs, receives DL RSs, and measures the RSs according to the configuration, the UE 116 performs measurement reporting. In certain embodiments, the measurement reporting contains the L smallest (or largest) RSRPs (or RSRQ, SINR) of the RSs and/or corresponding RS indices (e.g., SSB-RIs, CSI-RSs, SRIs), and/or corresponding panel indices. In certain embodiments, the measurement reporting contains the L smallest (or largest) RSRPs (or RSRQ, SINR) of the RSs and/or corresponding RS indices (e.g., SSB-RIs, CSI-RSs, SRIs) for each port of the $M_2$ antenna ports, that is, the first antenna panel 905, third antenna panel 1215, and fourth antenna panel 1220. In certain embodiments, the measurement reporting contains only the smallest (or largest) RSRP among the $N(=P)$ RS measurements. In certain embodiments, the measurement reporting contains panel ID information.

Compared to the multi-panel operations, beam failure event can frequently happen in scenarios where UE/NW can use beam-specific DL and UL operations. Beam failure can result because the UE can use different beam links for different DL and UL directions so that each beam link can be vulnerable to maintaining a good quality of radio link due to loss of diversity gain, which can be obtained if all of multi-panel are used for a same DL or UL direction. Therefore, to facilitate beam-specific DL and UL operations on a UE in a reliable manner, embodiments of the present disclosure provide several enhancements for link recovery and refinement procedures including measurement and assessment for link recovery, beam failure detection, new beam identification, beam failure recovery request/response, and radio (or beam) link refinement procedures.

Figure 21:
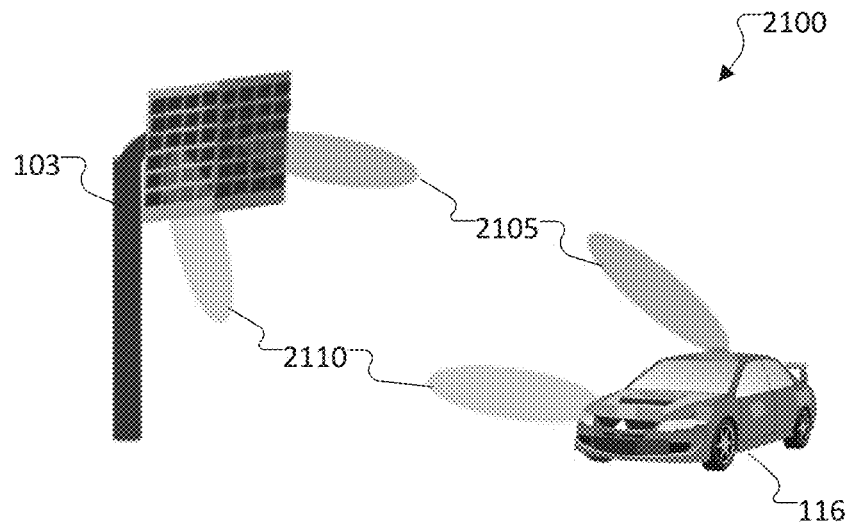
FIG. 21 illustrates a scenario in which a network (NW) communicates with a UE through multiple beam links according to this disclosure.

FIG. 21 illustrates a scenario in which a network (NW) communicates with a UE through multiple beam links according to this disclosure. The embodiment of the scenario 2100 shown in FIG. 21 is for illustration only. Other embodiments could be used without departing from the scope of the present disclosure.

The example shown in FIG. 21 illustrates the scenario 2100 in which a NW, or gNB or BS, such as gNB 103 communicates with UE 116 through multiple beam links. As an example, UE 116 is associated with BS 103, which is able to provide DL/UL configuration information that could be different for different beam links for the UE 116. The gNB 103 and UE 116 use beam pairs 2105 and 2110 for different DL/UL operations, such as DL and UL slot/symbol configurations. The term "beam pair" can refer to DL TX/RX beams, UL TX/RX beams, or DL TX/RX and UL TX/RX beams, which can be indicated by gNB 103, for example, during multi-beam operation. If beam correspondence holds, DL TX (RX) beams can be the same as UL RX (TX) beams. In this case, the "beam pair" can be determined by either DL TX/RX beams or UL RX/TX beams. If beam correspondence does not hold, DL TX/RX beams can be different from UL RX/TX beams, and thus the "beam pair" can include DL TX/RX and UL TX/RX beams for DL and UL operations, respectively, for no beam correspondence cases. In certain embodiments, a beam pair can refer to a spatial reception filter that is used by the UE 116 to receive a downlink reference signal such as an SSB or a CSI-RS, which is indicated by the gNB 103, whereas a spatial transmission filter used by the gNB 103 to transmit the downlink reference signal can be transparent to the UE 116. In certain embodiments, a beam pair can refer to a spatial transmission filter that is used by the UE 116 to transmit an uplink reference signal such as an SRS which is indicated by the gNB 103, whereas a spatial reception filter used by the gNB 103 to receive the uplink reference signal can be transparent to the UE 116. For UE 116 and gNB 103 in the illustrated example, DL/UL operation can be differently performed according to DL/UL configuration information associated with each of the beam pairs 2105 and 2110, respectively.

Figure 22:
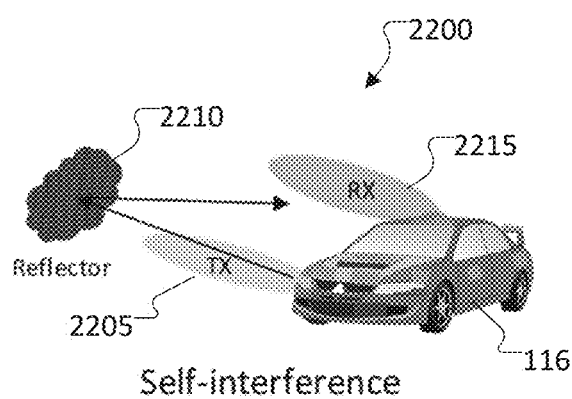
FIG. 22 illustrates a self-interference measurement by a UE according to embodiments of the present disclosure.

FIG. 22 illustrates a self-interference measurement by a UE according to embodiments of the present disclosure. The embodiment for self-interference measurement 2200 shown in FIG. 22 is for illustration only. Other embodiments could be used without departing from the scope of the present disclosure.

In the example shown in FIG. 22, the UE 116 transmits a signal via TX beam 2205. The signal is reflected by a reflective object such as reflector 2210 and received as self-interference via RX beam 2215. The Self-interference can vary in selected beams at panels at the UE 116. Additionally, self-interference can vary due to environments. That is, self-interference can vary for reasons other than because of panel front-to-back emission. Thus, in certain embodiments, beam management for beam division duplexing (BDD) is performed when considering for self-interference.

Figure 23:
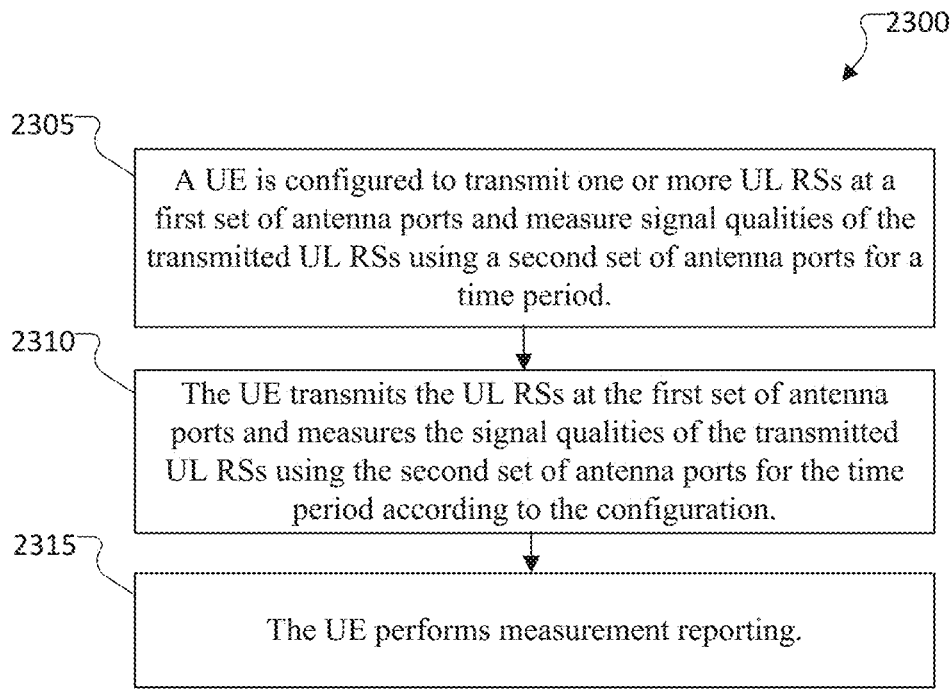
FIG. 23 illustrates another process for self-interference and DL RS measurement and reporting according to embodiments of the present disclosure.

FIG. 23 illustrates another process for self-interference and DL RS measurement and reporting according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 2300 depicted in the example depicted is implemented by a transmitter chain in, for example, a UE. Process 2300 can be accomplished by, for example, UE 114, 115, and 116 in network 600.

At operation 2305, the UE 116 is configured for one or multiple DL RS measurements at a first set of antenna ports with UL RS transmission(s) at a second set of antenna ports. In certain embodiments, the configured DL RSs can include CSI-RS, SSB, and DMRS. In certain embodiments, the configured DL RSs can be RSs for link recovery procedure and configured by higher layer with parameters failureDetectionResources, beamFailureDetectionResourcesList, candidateBeamRSList, candidateBeamRSListExt, and candidateBeamRSSCellList. In certain embodiments, the configured UL RSs can include SRS, DMRS, and/or any new type of UL RS. In certain embodiments, the configured UL RSs can be SRSs that correspond to the current beam links at a second set of antenna ports. In certain embodiments, the UL RSs can be SRSs that correspond to candidate beam links (e.g., indicated by high layer with parameter CandidateBeamRSs) for link recovery for a second set of antenna ports. The UE 116 can be configured to measure signal qualities of the DL RSs. In certain embodiments, the UE 116 can measure BLock Error Rates (BLERs) and/or RSRPs (or RSRQs, other metrics including Bit Error Rate (BER)) of DL RSs and/or UL RSs at a first set of antenna ports. In certain embodiments, UE 116 can measure BLERs and/or SINRs (or other metrics) of DL RSs at a first set of antenna ports, while transmitting UL RSs at a second set of antenna ports. For UL RS transmission, power control mechanisms can be applied or configured to reduce potential interference or other harmful effect to other entities, such as other UEs and/or neighboring cells. As an example, for self-interference measurement, the NW can configure UE 116 to transmit UL RS with a smaller (or larger) power than that for actual data transmission, and UE 116 can perform measurement and adjustment for the self-interference computation based on actual data transmission power.

At operation 2310, the UE 116 performs DL RS measurements at the first set of antenna ports with the UL RS transmission(s) at the second set of antenna ports according to the configuration.

At operation 2315, the UE 116 assesses radio link quality(-ties) for the configured DL RSs according to the measurements. In certain embodiments, the UE 116 can assess radio link qualities for DL RSs in failureDetectionResources to detect beam failure event for link recovery procedure. In another example, the UE 116 can assess radio link qualities for DL RSs in candidateBeamRS to identify candidate beams for link recovery procedure. In certain embodiments, the radio link quality assessment on DL RS for a first set of antenna ports can be performed with considering effects (e.g., self-interference) from UL RS transmission at a second set of antenna ports.

Figure 24:
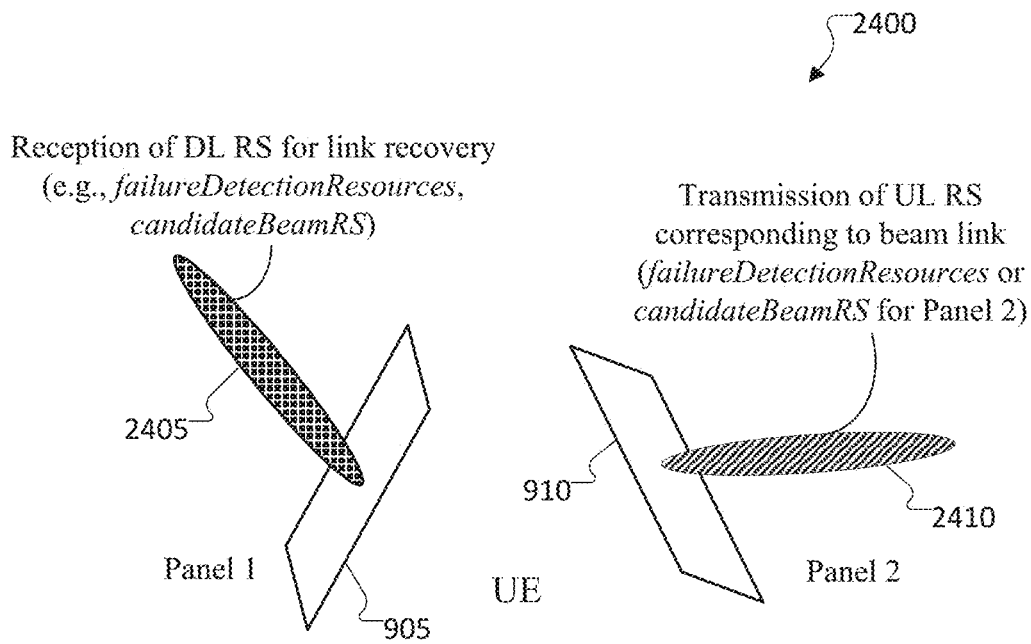
FIG. 24 illustrates measurement of SINR including self-interference according to embodiments of the present disclosure.

FIG. 24 illustrates measurement of SINR including self-interference according to embodiments of the present disclosure. The embodiment of the SINR measurement 2400 shown in FIG. 24 is for illustration only. Other embodiments could be used without departing from the scope of the present disclosure.

In certain embodiments, the UE 116 is configured to receive DL RS of failureDetectionResources (or candidateBeamRS) at the first antenna panel 905, while transmitting UL RS, at the second antenna panel 910, corresponding to beam link (i.e., failureDetectionResources or candidateBeamRS for the second antenna panel 910) for the second antenna panel 910. In the illustrated example, a first set of antenna ports corresponds the first antenna panel 905 and a second set of antenna ports corresponds to the second antenna panel 910. Thus, the UE 116 can measure radio link quality (including SINR, BLER, RSRP, RSRQ) of DL RS with DL RX beam 2405 corresponding to TCI-state on DL RS at the first antenna panel 905 while transmitting UL RS with UL TX beam 2410 corresponding to the current/candidate beam link (failureDetectionResources/candidateBeamRS for the second antenna panel 910) for the second antenna panel 910. In certain embodiments, the UE 116 may perform successive interference cancellation operation to measure RSRPs of DL RS and/or UL RS, respectively.

Figure 25:
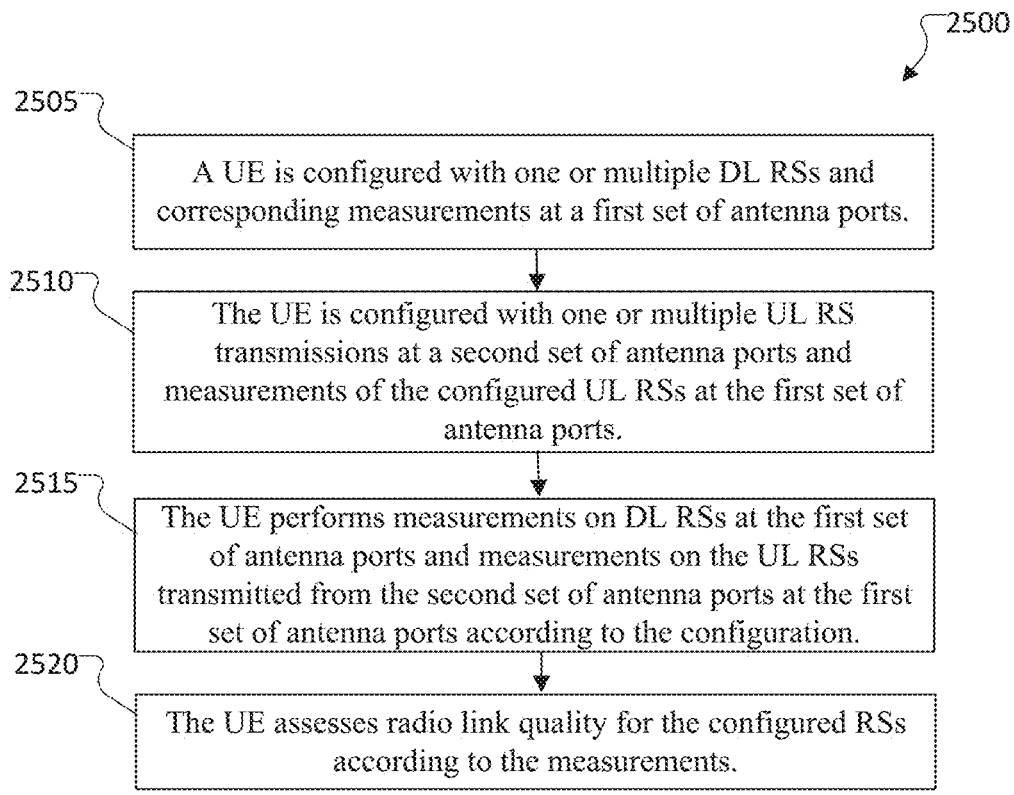
FIG. 25 illustrates another process for measurement and assessment for link recovery according to embodiments of the present disclosure.

FIG. 25 illustrates another process for measurement and assessment for link recovery according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 2500 depicted in the example depicted is implemented by a transmitter chain in, for example, a UE. Process 2500 can be accomplished by, for example, UE 114, 115, and 116 in network 600.

At operation 2505, a UE 116 is configured with one or multiple DL RSs and corresponding measurements at a first set of antenna ports. In certain embodiments, DL RSs can include CSI-RS, SSB, and DMRS. In certain embodiments, the DL RSs can be configured by higher layer with parameters failureDetectionResources, beamFailureDetectionResourcesList, candidateBeamRSList, candidateBeamRSListExt, and candidateBeamRSSCellList. In certain embodiments, the UE 116 can measure BLERs and/or RSRPs (and/or RSRQs, SINRs, and/or other metrics including BER) of DL RSs.

At operation 2510, the UE 116 is configured with one or multiple UL RS transmissions at a second set of antenna ports and measurements of the configured UL RSs at the first set of antenna ports. In certain embodiments, the UE 116 can be configured to transmit UL RSs corresponding to current beam links (e.g., failureDetectionResources) and/or candidate beam links (e.g., candidateBeamRS) at a second set of antenna ports, and measure signal qualities of the UL RSs with DL RX beams, at the first set of antenna ports, corresponding to the configured DL RSs (i.e., the same DL RX beams used to receive the DL RSs, which are indicated by TCI-state). In certain embodiments, the configured UL RSs can include SRS, DMRS, and/or any new type of UL RS. In certain embodiments, the configured UL RSs can be SRSs that correspond to the current beam links at a second set of antenna ports. In certain embodiments, the configured UL RSs can be SRSs that correspond to candidate beam links (e.g., indicated by high layer with parameter CandidateBeamRSs) for link recovery for a second set of antenna ports. For the UL RS measurements, the UE 116 can measure RSRPs of the UL RSs transmitted from a second set of antenna ports, at a first set of antenna ports with same DL RX beams as the ones used to receive DL RSs for link recovery for the first set of antenna ports. For UL RS transmission, power control mechanisms can be applied or configured to reduce potential interference or other harmful effect to other entities (e.g., other UEs and/or neighboring cells). As an example, for self-interference measurement, NW, or gNB 103, can configure UE 116 to transmit UL RS with a smaller (or larger) power than that for actual data transmission, and UE 116 can perform measurement and adjustment for the self-interference computation based on actual data transmission power.

At operation 2515, the UE 116 performs measurements on DL RSs at the first set of antenna ports and measurements on the UL RSs transmitted from the second set of antenna ports at the first set of antenna ports according to the configuration.

At operation 2520, the UE 116 assesses radio link quality for the configured RSs according to the measurements. In certain embodiments, UE 116 can assess radio link qualities for DL RSs of failureDetectionResources to detect beam failure event. In certain embodiments, the UE 116 can assess radio link qualities for DL RSs of candidateBeamRS to identify candidate beams for link recovery. In certain embodiments, the radio link quality assessment on DL RS for a first set of antenna ports can be performed with considering effects (e.g., self-interference) from UL RS transmission at a second set of antenna ports.

Figure 26:
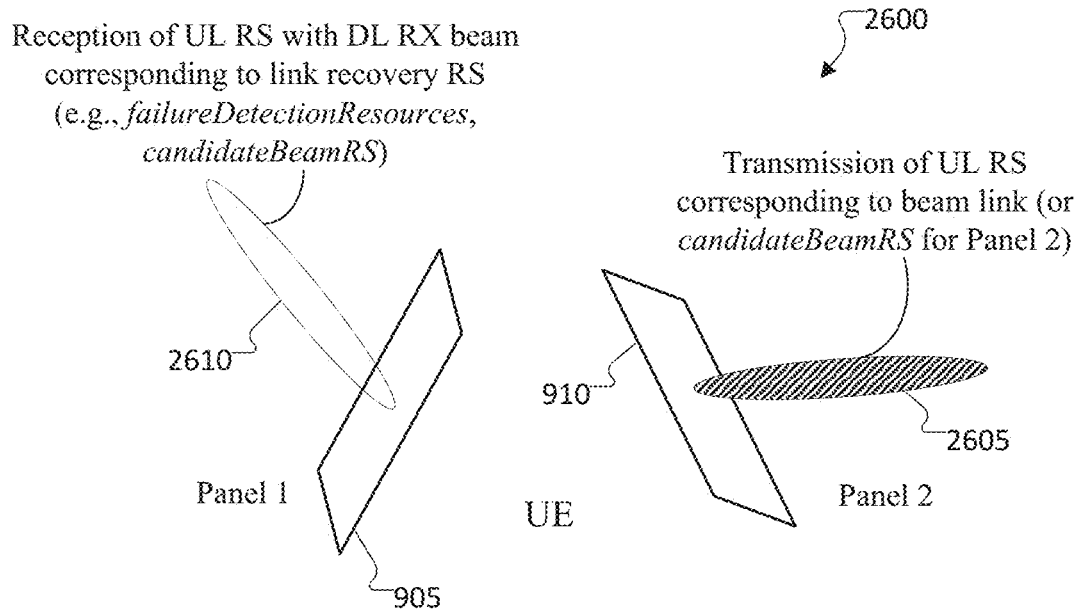
FIG. 26 illustrates self-interference measurement according to embodiments of the present disclosure.

FIG. 26 illustrates self-interference measurement according to embodiments of the present disclosure. The embodiment of the self-interference measurement 2600 shown in FIG. 26 is for illustration only. Other embodiments could be used without departing from the scope of the present disclosure.

In certain embodiments, a UE 116 is configured to transmit UL RS at the second antenna panel 910 with UL TX beam 2605 corresponding to the current/candidate beam link (failureDetectionResources or candidateBeamRS for the second antenna panel 910) for the second antenna panel 910, and measure signal quality of the UL RS at the first antenna panel 905 with a same DL RX beam 2610 as the DL RX beam used to receive link recovery RS (e.g., failureDetectionResources, candidateBeamRS for the first antenna panel 905) for the first antenna panel 905. Thus, the UE 116 can measure RSRP (i.e., self-interference RSRP) of UL RS, transmitted from the second antenna panel 910, at the first antenna panel 905 using DL RX beam for the link recovery RS. In this example, a first set of antenna ports and a second set of antenna ports correspond to the first antenna panel 905 and the second antenna panel 910, respectively.

Figure 27:
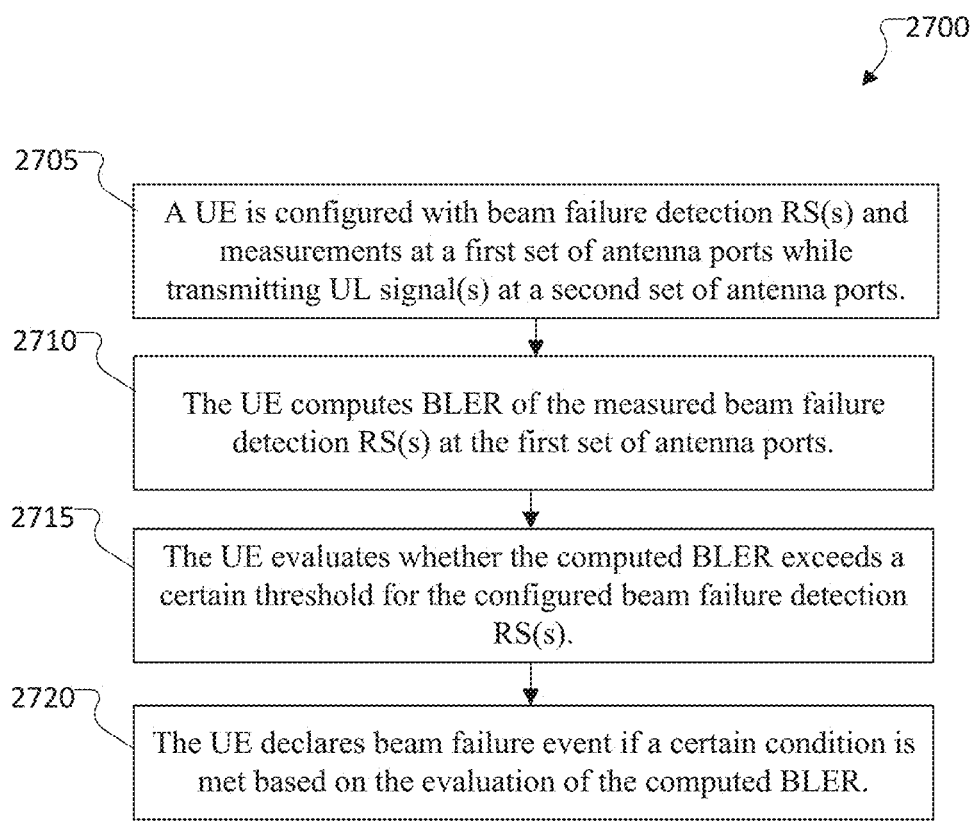
FIG. 27 illustrates a beam failure process according to embodiments of the present disclosure.

FIG. 27 illustrates a beam failure process according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 2700 depicted in the example depicted is implemented by a transmitter chain in, for example, a UE. The beam failure process 2700 can be accomplished by, for example, UE 114, 115, and 116 in network 600. In certain embodiments, the processes, operations, and components for RS measurements assessment and link recovery described above are equally applicable to, and included with, the beam failure process 2700.

At operation 2705, the UE 116 is configured with beam failure detection RS(s) and measurements at a first set of antenna ports while transmitting UL signal(s) at a second set of antenna ports. In certain embodiments, UL signals can be UL RSs and/or UL data signals. To assess radio link quality such as BLER or BER on beam failure detection RS with self-interference, measurements at a first set of antenna ports may need to be performed while transmitting UL signals at a second set of antenna ports.

At operation 2710, the UE 116 computes BLER of the measured beam failure detection RS(s) at the first set of antenna ports. For example, the UE 116 can compute radio link quality such as BLER or BER for beamFailureResources $\bar{q}_0$ at a first set of antenna ports while transmitting UL RSs or UL data signals at a second set of antenna ports. In another example, the UE 116 can compute radio link quality for beamFailureResources $\bar{q}_0$ for a first set of antenna ports regardless of transmitting UL RSs at a second set of antenna ports. In one example, the UE 116 can compute radio link quality beamFailureResources $\bar{q}_0$ for a first set of antenna ports considering previous measurements of UL RS transmitted from a second set of antenna ports at the first set of antenna ports. In this case, UE 116 can measure radio link quality such as SINR.

At operation 2715, the UE 116 evaluates whether the computed BLER exceeds a certain threshold for the configured beam failure detection RS(s). In certain embodiments, a certain threshold can be configured or pre-determined.

At operation 2720, the UE 116 declares beam failure event if a certain condition is met based on the evaluation of the computed BLER (or BER). In certain embodiments, the UE 116 can consider a condition that the BLER (or BER) exceeds the threshold for N consecutive RS measurements. In certain embodiments, the UE 116 can consider a condition that the BLER (or BER) exceeds the threshold for M(≤N) out of N RS measurements.

Figure 28:
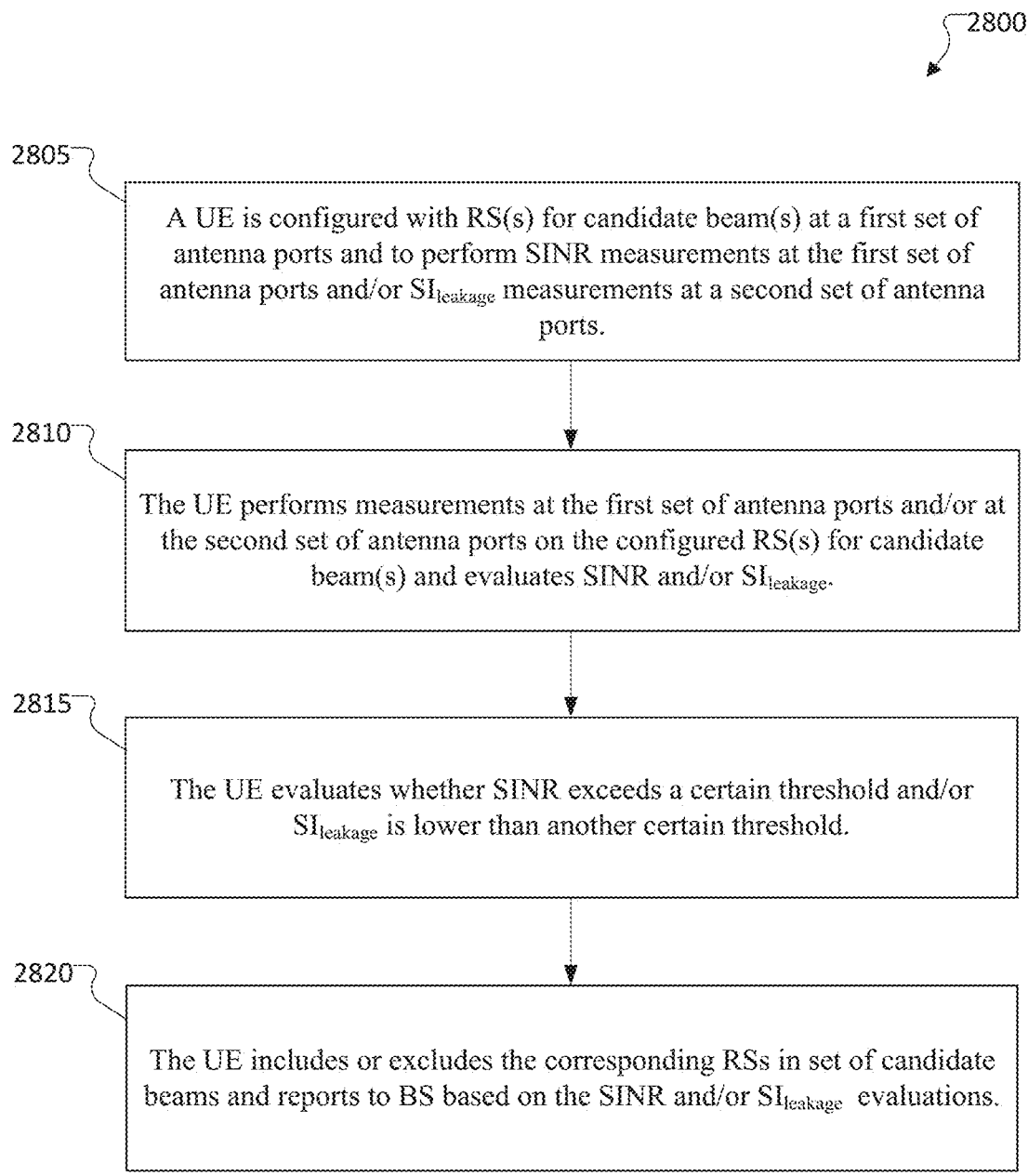
FIG. 28 illustrates a new beam identification process 2800 according to embodiments of the present disclosure.

FIG. 28 illustrates a new beam identification process according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The new beam identification process 2800 depicted in the example depicted is implemented by a transmitter chain in, for example, a UE. The new beam identification process 2800 can be accomplished by, for example, UE 114, 115, and 116 in network 600. In certain embodiments, the processes, operations, and components for RS measurements assessment and link recovery described above are equally applicable to, and included with, the new beam identification process 2800.

In certain embodiments, the UE 116 performs assessment on radio link qualities using RS measurements to identify candidate beams, as illustrated in the new beam identification process 2800. In certain embodiments, the processes, operations, and components for RS measurements assessment and link recovery and beam failure detection described above are equally applicable to, and included with, the new beam identification process 2800. To identify candidate beams, two measurement metrics can be considered: 1) radio link qualities of candidate beams, for example, SINR including self-interference, and 2) self-interference leakage from a set of antenna ports to another set of antenna ports, which we denote by $SI_{leakage}$, hereafter.

At operation 2805, the UE 116 is configured with RS(s) for candidate beam(s) at a first set of antenna ports and to perform SINR measurements at the first set of antenna ports and/or $SI_{leakage}$ measurements at a second set of antenna ports. In certain embodiments, RS(s) for candidate beam(s) can be high-layer parameter candidateBeamRS $\bar{q}_1$. In certain embodiments, SINR measurements on RSs for candidate beams can be performed at a first set of antenna ports while UL RSs (or UL data signals) are transmitted at a second set of antenna ports. Here, for example, the UL RSs can correspond to current beam links (e.g., corresponding to beam failure detection RSs) for a second set of antenna ports. In certain embodiments, SINR measurements on RSs for candidate beams can be performed at a first set of antenna ports by combining RSRP measurements on the candidate beam DL RSs and RSRP measurements on UL RSs transmitted from a second set of antenna ports, and those RSRP measurements can be separately measured in time. In certain embodiments $SI_{leakage}$ measurements can be performed by transmitting UL RSs, at a first set of antenna ports, corresponding to candidate beam RSs and measuring the UL RSs at a second set of antenna ports. In certain embodiments, $SI_{leakage}$ measurements can be performed by transmitting UL RSs at a first set of antenna ports with UL TX beams corresponding to candidate beam DL RSs and measuring the UL RSs at a second set of antenna ports with DL RX beams corresponding to current beam links (e.g., corresponding to beam failure detection RSs) for the second set of antenna ports. The $SI_{leakage}$ can be considered as a measure on how candidate beams at a set of antenna ports will affect self-interference to current beam links at another set of antenna ports.

At operation 2810, the UE 116 performs measurements at the first set of antenna ports and/or at the second set of antenna ports on the configured RS(s) for candidate beam(s) and evaluates SINR and/or $SI_{leakage}$ according to the configuration.

At operation 2815, the UE 116 evaluates whether SINR exceeds a first threshold and/or $SI_{leakage}$ is lower than a second threshold. In certain embodiments, the two threshold can be configured or pre-determined. In certain embodiments, one threshold value can be configured and the other threshold can be pre-determined. At operation 2820, the UE 116 includes or excludes the corresponding RSs in set of candidate beams and reports to BS based on the SINR and/or $SI_{leakage}$ evaluations. In certain embodiments, a set of candidate beams can be $q_{new}$, and $q_{new}$ can be updated by including or excluding the corresponding RSs whose SINR exceeds the first threshold and/or $SI_{leakage}$ is lower than the second threshold during the RS measurements. In certain embodiments, (part of) $q_{new}$ can be reported to BS 103 after the UE 116 declares beam failure event. Details on reporting (such as beam failure recovery request) are described herein below with respect to FIG. 29.

Figure 29:
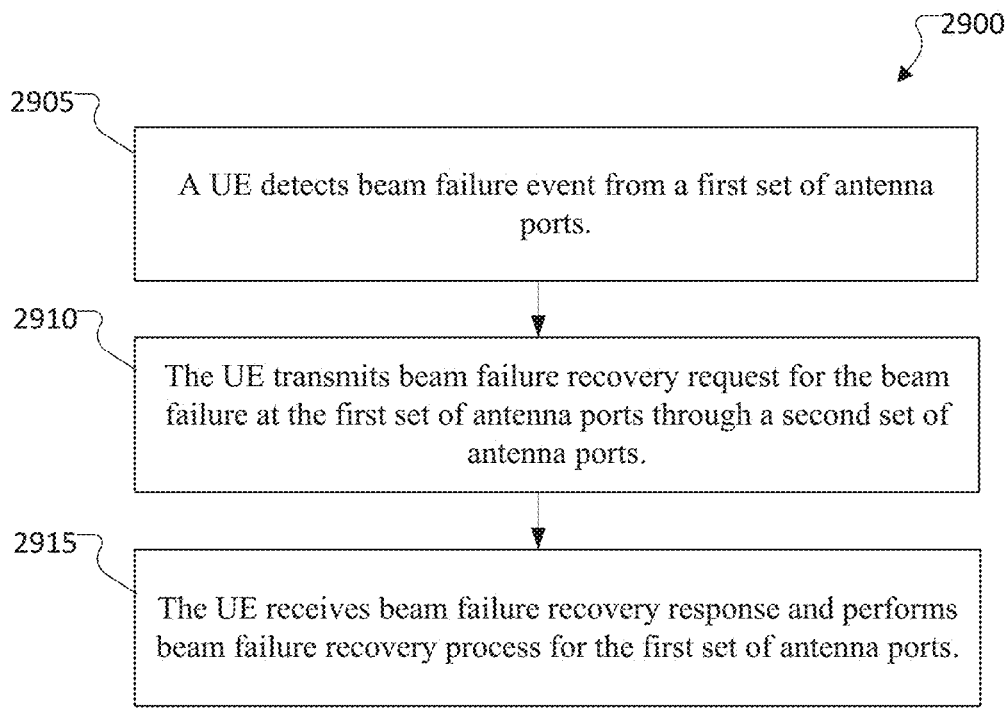
FIG. 29 illustrates a beam failure recovery request/response process 2900 according to embodiments of the present disclosure.

FIG. 29 illustrates a beam failure recovery request/response process according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The beam failure recovery request/response process 2900 depicted in the example depicted is implemented by a transmitter chain in, for example, a UE. The beam failure recovery request/response process 2900 can be accomplished by, for example, UE 114, 115, and 116 in network 600. In certain embodiments, the processes, operations, and components for RS measurements assessment and link recovery described above are equally applicable to, and included with, the beam failure recovery request/response process 2900.

At operation 2905, the UE 116 detects a beam failure event from a first set of antenna ports. In certain embodiments, the UE 116 further declares the beam failure event from a first set of antenna ports. In certain embodiments, the UE 116 can follow any variant of beam failure process 2700 to declare beam failure event.

At operation 2910, the UE 116 transmits beam failure recovery request for the beam failure at the first set of antenna ports through a second set of antenna ports. In one example, beam failure recovery request (BFRQ) can be composed of two steps. In the first step of BFRQ, scheduling request (SR)-like PUCCH can be transmitted to BS through a second set of antenna ports to report beam failure event happens, where SR-like PUCCH can be configured based on PUCCH format 0 or PUCCH format 1 or other PUCCH formats. In the second step of BFRQ, once UL transmission is granted at the second set of antenna port, information on candidate beams in anew can be reported via MAC CE through the second set of antenna ports. For example, if new candidate beam is identified in any variant of new beam identification process 2800, the UE 116 can report information that no candidate beam is identified. As another example, if multiple candidate beams exist in $q_{new}$, one, part, or all of them can be selected based on a decision by the UE 116 or based on a predetermined rule. Additionally, the multiple candidate beams can be reported. In certain embodiments, the second step of BFRQ can be transmitted via MAC CE without the first operation of BFRQ, if UL transmission at the second set of antenna ports has been already granted.

At operation 2915, the UE 116 receives beam failure recovery response and performs beam failure recovery process for the first set of antenna ports. In certain embodiments, the beam failure recovery response can be a normal uplink grant to schedule a new transmission for the same HARQ process as PUSCH carrying the second step of MAC CE transmission.

Figure 30:
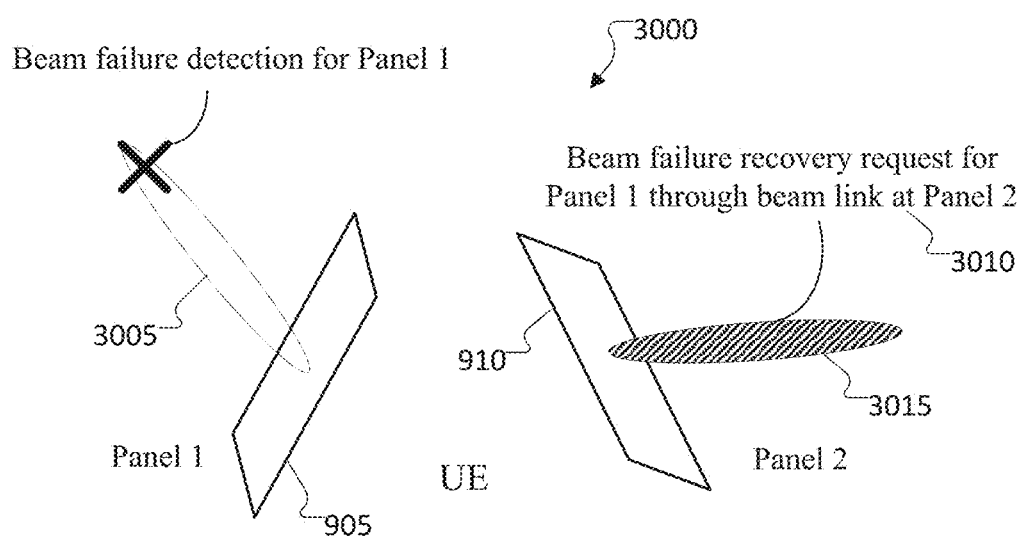
FIG. 30 illustrates a beam failure recovery request according to embodiments of the present disclosure.

FIG. 30 illustrates a beam failure recovery request according to embodiments of the present disclosure. The embodiment of the beam failure recovery request 3000 shown in FIG. 30 is for illustration only. Other embodiments could be used without departing from the scope of the present disclosure.

In certain embodiments, the UE 116 declares beam failure event for the first antenna panel 905, which corresponds to a first set of antenna ports. That is, the UE 116 detects a beam failure on at least one beam 3000. Thereafter, UE 116 transmits a beam failure recovery request 3010 for the first antenna panel 905 to gNB 103, through beam link 3015 at the second antenna panel 910, which corresponds to a second set of antenna ports. In certain embodiments, the operation in which the BFRQ transmission for the beam failure event at for the first antenna panel 905 is performed at for the second antenna panel 910 is different from other systems.

Figure 31:
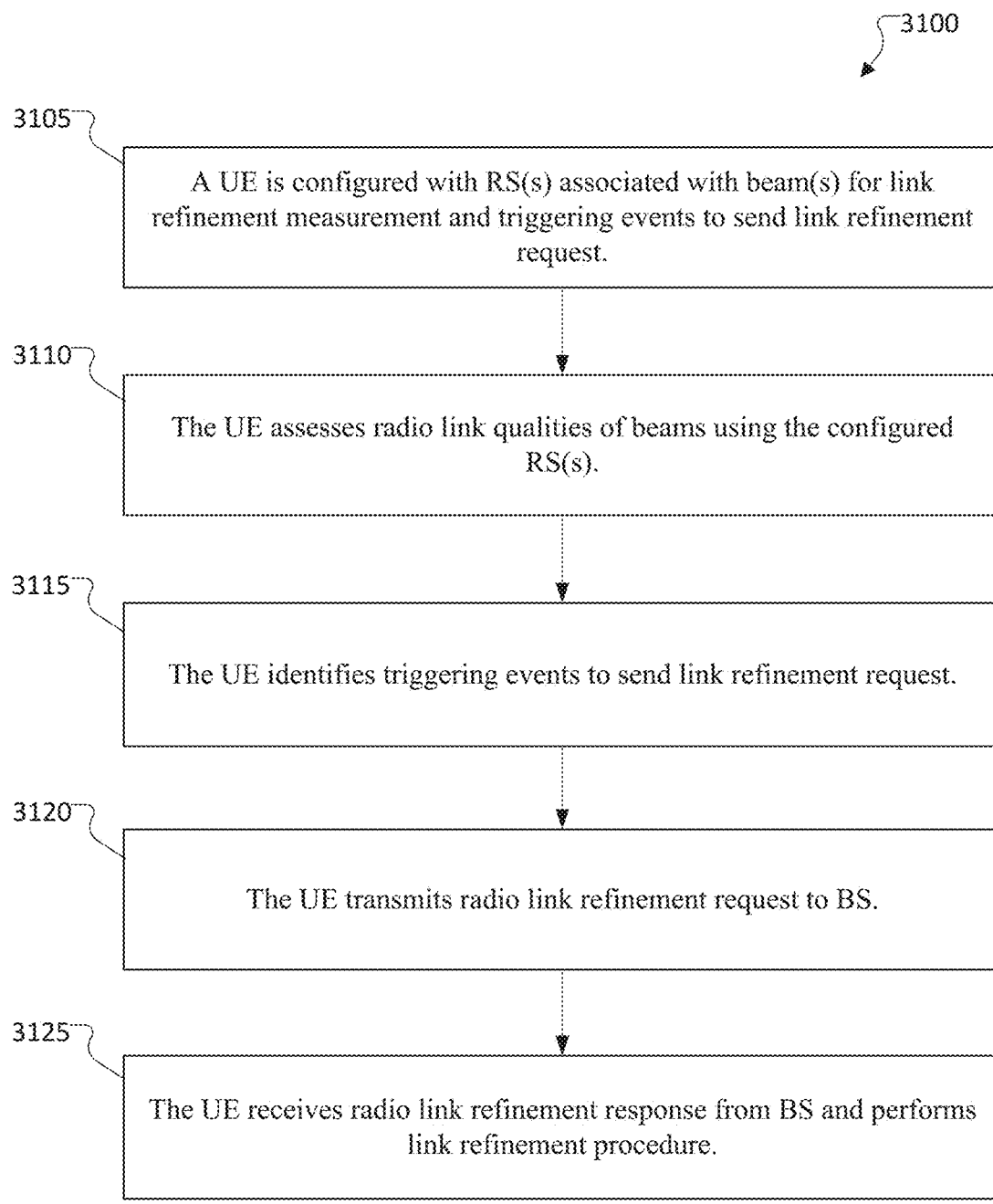
FIGS. 31 and 32 illustrate beam link refinement processes according to embodiments of the present disclosure.

FIG. 31 illustrates a beam link refinement process according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The beam link refinement process 3100 depicted in the example depicted is implemented by a transmitter chain in, for example, a UE. The beam link refinement process 3100 can be accomplished by, for example, UE 114, 115, and 116 in network 600.

At operation 3105, the UE 116 is configured with RS(s) associated with beam(s) for link refinement measurement and triggering events to send link refinement request. In certain embodiments, the RSs associated with beams for link refinement measurement can include DL and/or UL RSs, e.g., SRS, CSI-RS, SSB, DMRS, and so on. For UL RS transmission, power control mechanisms can be applied or configured to reduce potential interference or other harmful effect to other entities (e.g., other UEs and/or neighboring cells). As an example, for self-interference measurement, the NW (e.g., by or through gNB 103) can configure UE 116 to transmit UL RS with a smaller (or larger) power than that for actual data transmission, and UE 116 can perform measurement and adjustment for the self-interference computation based on actual data transmission power. In certain embodiments, the RSs associated with beams for link refinement measurement can include failureDetectionResources $\bar{q}_0$ and candidateBeamRS $\bar{q}_1$. For example, in one configuration, the UE 116 can perform measurements for each of configured RSs and consider triggering events and compare the measurements with triggering events to determine link refinement request transmission or not.

At operation 3110, the UE 116 assesses radio link qualities of beams using the configured RS(s). In certain embodiments, the UE 116 performs measurements of RSRP (or RSRQ, SINR) on the configured RSs, for example, failureDetectionResources $\bar{q}_0$ and candidateBeamRS and assesses radio link qualities of beams corresponding to the configured RSs, i.e., $\bar{q}_0$ and $\bar{q}_1$.

At operation 3115, the UE 116 identifies triggering events to send link refinement request. In certain embodiments, triggering events can include comparison between radio link qualities of beams corresponding to $\bar{q}_0$ and $\bar{q}_1$. More specifically, in one example, the UE 116 can check if radio link quality of a certain beam in $\bar{q}_1$ becomes better than radio link quality of beams corresponding to $\bar{q}_0$. This can imply one of candidate beam link quality becomes better than that of the current beam links (failureDetectionResources $\bar{q}_0$) being used for data transmission/reception.

At operation 3120, the UE 116 transmits radio link refinement request (RLRQ) to BS. In certain embodiments, the RLRQ can contain information on the RSs (that have better radio link quality) and corresponding radio link qualities. For example, CSI-RS resource indicator (CRI)/SS-PBCH Block Resource indicator (SSBRI) and/or corresponding RSRP, RSRQ, or SINR can be included in the RLRQ information. In certain embodiments, the RLRQ can be performed with two step operations, as similar in the two step operations described with respect to the beam failure recovery request response process 2900.

At operation 3125, the UE 116 receives radio link refinement response (RLRR) from BS and performs link refinement procedure. In certain embodiments, the RLRR can be performed via MAC-CE or DCI or RRC signaling. In certain embodiments, the RLRR can include ACK/NACK information such as 1-bit indicator in DCI. In certain embodiments, the RLRR can be performed via DCI (or MAC CE) with indicating CRI/SSBRI among the selected candidate RSs in RLRQ.

Figure 32:
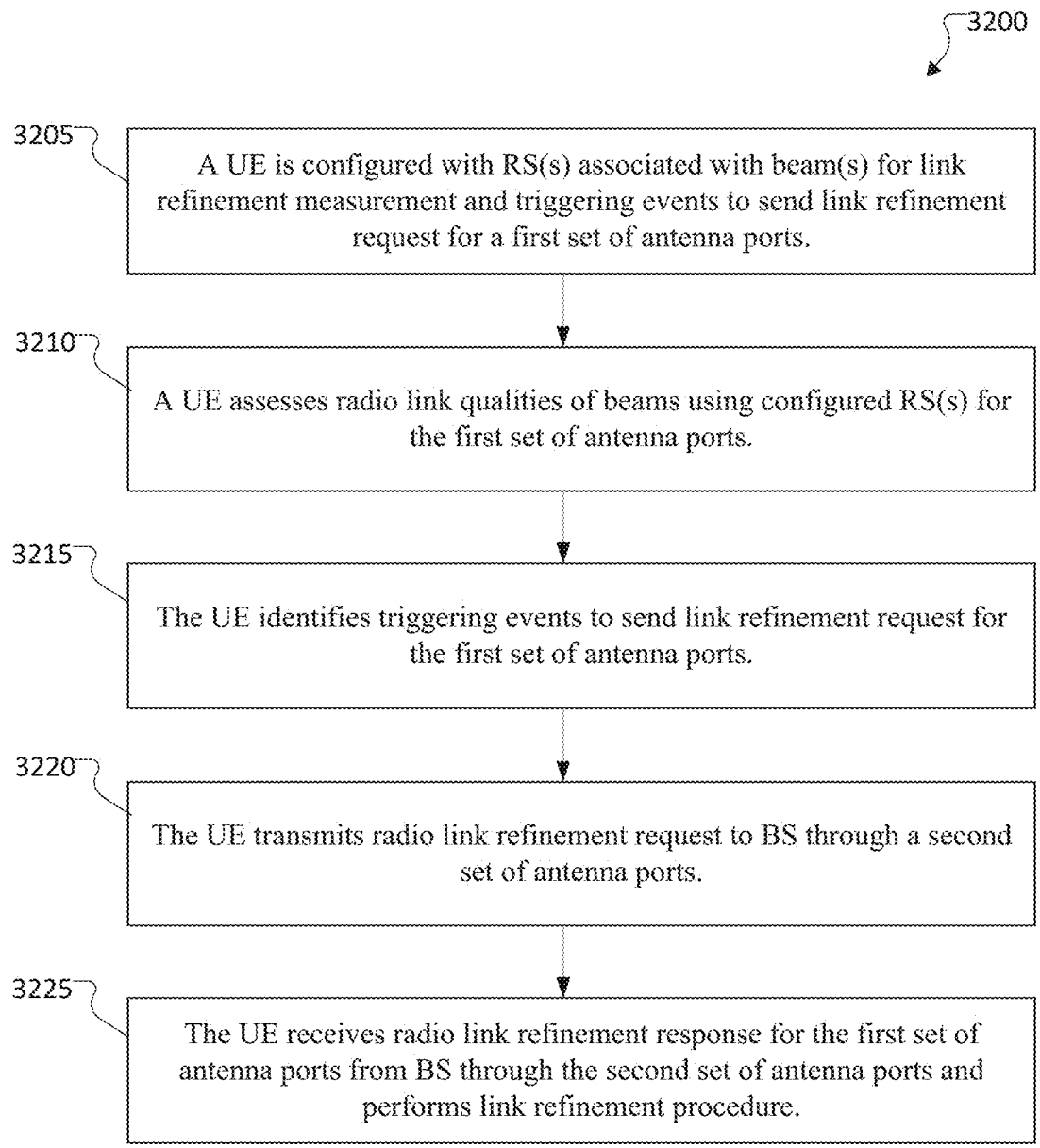

FIG. 32 illustrates another beam link refinement process according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The beam link refinement process 3200 depicted in the example depicted is implemented by a transmitter chain in, for example, a UE. The beam link refinement process 3200 can be accomplished by, for example, UE 114, 115, and 116 in network 600. Certain embodiments of the beam link refinement process 3200 includes multi-panel operations with different beam links each of which can have different DL/UL slot/symbol configurations.

At operation 3205, a UE 116 is configured with RS(s) associated with beam(s) for link refinement measurement and triggering events to send link refinement request for a first set of antenna ports. In certain embodiments, the RSs associated with beams for link refinement measurement can include DL and/or UL RSs, e.g., SRS, CSI-RS, SSB, DMRS, and so on. For UL RS transmission, power control mechanisms can be applied or configured to reduce potential interference or other harmful effect to other entities (e.g., other UEs and/or neighboring cells). As an example, for self-interference measurement, the NW (e.g., gNB 103) can configure the UE 116 to transmit UL RS with a smaller (or larger) power than that for actual data transmission, and the UE 116 can perform measurement and adjustment for the self-interference computation based on actual data transmission power. In certain embodiments, the RSs associated with beams for link refinement measurement can include failureDetectionResources $\bar{q}_0$ and candidateBeamRS $\bar{q}_1$ for a first set of antenna ports. For example, in one configuration, the UE 116 can perform measurements for each of configured RSs and consider triggering events and compare the measurements with triggering events to determine link refinement request transmission or not. Details on triggering events shall be described with respect to FIG. 33.

At operation 3210, the UE 116 assesses radio link qualities of beams using configured RS(s) for the first set of antenna ports. In one example, the UE performs measurements of RSRP (or RSRQ, SINR) on the configured RSs, for example, failureDetectionResources $\bar{q}_0$ and candidateBeamRS $\bar{q}_1$, and assesses radio link qualities of beams corresponding to the configured RSs, i.e., $\bar{q}_0$ and $\bar{q}_1$. In certain embodiments, the UE 116 performs measurements of SINRs including self-interference, at the first set of antenna ports, corresponding to $\bar{q}_0$ and $\bar{q}_1$, and/or can perform measurements of $SI_{leakage}$s at another set of antenna ports. In certain embodiments, the $SI_{leakage}$ measurements can be performed by transmitting UL RSs, at a first set of antenna ports, corresponding to $\bar{q}_0$ and $\bar{q}_1$, and measuring the UL RSs at another set of antenna ports. In certain embodiments, the $SI_{leakage}$ measurements can be performed by transmitting UL RSs at a first set of antenna ports with UL TX beams corresponding to $\bar{q}_0$ and $\bar{q}_1$, and measuring the UL RSs at another set of antenna ports with DL RX beams corresponding to current beam links (or beam failure detection RSs) for the set of antenna ports. The $SI_{leakage}$ can be considered as a measure on how candidate beams at a set of antenna ports will affect self-interference to current beam links at another set of antenna ports.

At operation 3215, the UE 116 identifies triggering events to send link refinement request for the first set of antenna ports. In certain embodiments, triggering events can include comparison between radio link qualities (e.g., SINR including self-interference and/or $SI_{leakage}$) of beams corresponding to $\bar{q}_0$ and $\bar{q}_1$ for the first set of antenna ports. More specifically, in one example, the UE 116 can check if radio link quality of a certain beam in $\bar{q}_1$ becomes better than radio link quality of beams corresponding to $\bar{q}_0$ for the first set of antenna ports. This can imply one of candidate beam link quality becomes better than that of the current beam links (failureDetectionResources $\bar{q}_0$) being used for data transmission/reception for the first set of antenna ports. Details on triggering events shall be described with respect to FIG. 33.

At operation 3220, the UE 116 transmits RLRQ to BS, e.g, gNB 103, through a second set of antenna ports. In certain embodiments, the RLRQ can contain information on the RSs (that have better radio link quality) and corresponding radio link qualities. For example, the CRI and/or corresponding RSRP, RSRQ, or SINR can be included in the RLRQ information. In certain embodiments, the RLRQ can be performed with two step operations, as similar in the two step operations described herein above with respect to FIG. 29. In certain embodiments, a second set of antenna ports to be used for RLRQ transmission can be selected in a predetermined rule or based on configuration. In certain embodiments, a second set of antenna ports can be selected to a set of antenna ports that has the nearest uplink grant among all of antenna ports after the triggering events to send RLRQ for the first set of antenna ports are identified.

At operation 3225, the UE 116 receives radio link refinement response for the first set of antenna ports from BS through the second set of antenna ports and performs link refinement procedure. In certain embodiments, the RLRR can be performed via MAC-CE or DCI or RRC signaling. In certain embodiments, the RLRR can include ACK/NACK information such as 1-bit indicator in DCI. In certain embodiments, the RLRR can include DCI indication among the selected candidates in RLRQ.

Figure 33:
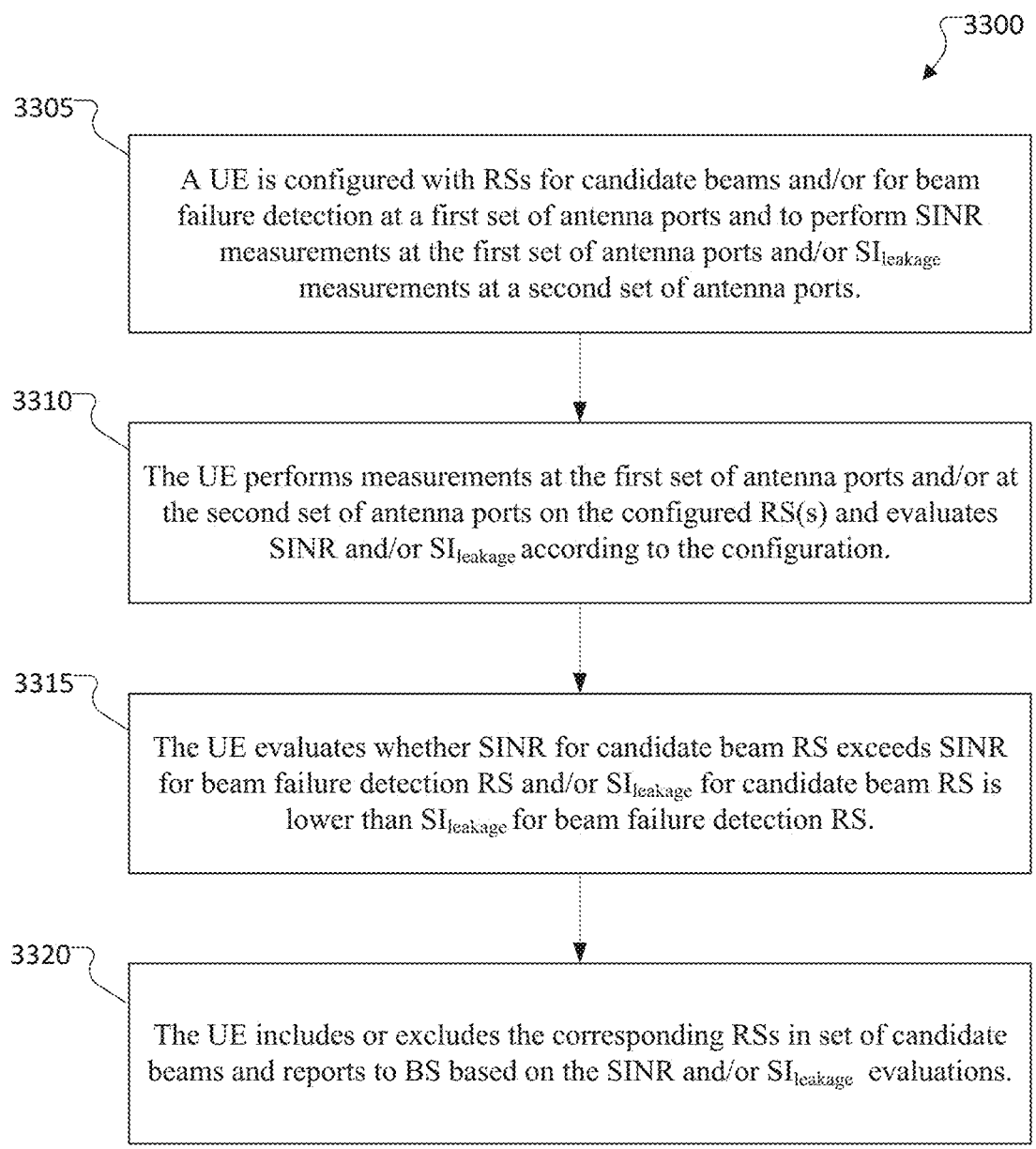
FIG. 33 illustrates a new beam identification process according to embodiments of the present disclosure.

FIG. 33 illustrates new beam identification process according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The new beam identification process 3300 depicted in the example depicted is implemented by a transmitter chain in, for example, a UE. The new beam identification process 3300 can be accomplished by, for example, UE 114, 115, and 116 in network 600. Certain embodiments of the beam link refinement process 3200 includes multi-panel operations with different beam links each of which can have different DL/UL slot/symbol configurations.

In certain embodiments, the processes, operations, and components for RS measurements assessment and link recovery described above are equally applicable to, and included with, the new beam identification process 3300. To identify improved radio links for candidate beams, two measurement metrics can be considered: 1) radio link qualities of candidate beams (e.g., corresponding to candidate-BeamRS $\bar{q}_1$) and/or current beams (corresponding to failureDetectionResources $\bar{q}_0$, for example, SINR including self-interference, and 2) $SI_{leakage}$ from a set of antenna ports to another set of antenna ports.

At operation 3305, a UE is configured with RSs for candidate beams and/or for beam failure detection at a first set of antenna ports and to perform SINR measurements at the first set of antenna ports and/or $SI_{leakage}$ measurements at a second set of antenna ports. In certain embodiments, RS(s) for candidate beam(s) and/or beam failure detection can be high-layer parameter candidateBeamRS $\bar{q}_1$ and/or failureDetectionResources $\bar{q}_0$. In certain embodiments, SINR measurements on RSs for candidate beams and/or beam failure detection can be performed at a first set of antenna ports while UL RSs (or UL data signals) are transmitted at a second set of antenna ports. For example, the UL RSs can correspond to current beam links (or beam failure detection RSs) for a second set of antenna ports. In certain embodiments, the SINR measurements on RSs for candidate beams and/or beam failure detection can be performed at a first set of antenna ports by combining RSRP measurements on the candidate beam and/or beam failure DL RSs and RSRP measurements on UL RSs transmitted from a second set of antenna ports, and those RSRP measurements can be separately measured in time. In certain embodiments, the $SI_{leakage}$ measurements are performed by transmitting UL RSs, at a first set of antenna ports, corresponding to candidate beam and/or beam failure detection RSs and measuring the UL RSs at a second set of antenna ports. In certain embodiments, the $SI_{leakage}$ measurements are performed by transmitting UL RSs at a first set of antenna ports with UL TX beams corresponding to candidate beam and/or beam failure detection DL RSs and measuring the UL RSs at a second set of antenna ports with DL RX beams corresponding to current beam links (or beam failure detection RSs) for the second set of antenna ports. The $SI_{leakage}$ can be considered as a measure on how candidate beams and/or current beams at a set of antenna ports will affect self-interference to current beam links at another set of antenna ports.

At operation 3310, the UE 116 performs measurements at the first set of antenna ports and/or at the second set of antenna ports on the configured RS(s) and evaluates SINR and/or $SI_{leakage}$ according to the configuration.

At operation 3315, the UE 116 evaluates whether SINR for candidate beam RS exceeds SINR for beam failure detection RS and/or $SI_{leakage}$ for candidate beam RS is lower than $SI_{leakage}$ for beam failure detection RS. In certain embodiments, the UE 116 can identify candidate beam RS(s) $x \in \bar{q}_1$ such that $SINR_x \geq SINR_y$ and $SI_{leakage,x} \leq SI_{leakage,y}$, where for any $y \in \bar{q}_0$. That is, the UE 116 can check if radio link quality of a certain beam in $\bar{q}_1$ becomes better than radio link quality of beams corresponding to $\bar{q}_0$ for the first set of antenna ports. In certain embodiments, some metrics (such as RSRP, RSRQ) other than SINR can be considered to assess radio link quality.

At operation 3320, the UE 116 includes or excludes the corresponding RSs in set of candidate beams and reports to BS based on the SINR and/or $SI_{leakage}$ evaluations. In certain embodiments, a set of candidate beams for radio link refinement can be updated by including or excluding the corresponding RSs whose SINR exceeds those of beam failure detection RSs and/or $SI_{leakage}$ is lower than those of beam failure detection RSs during the RS measurements. In certain embodiments, the UE 116 reports the identified set to BS once a number of candidate beams that have better radio link qualities in the set exceed a certain number. In another example, whenever a candidate beam link having better link qualities than the current beams is identified, the UE 116 can report information on the candidate beam.

Figure 34:
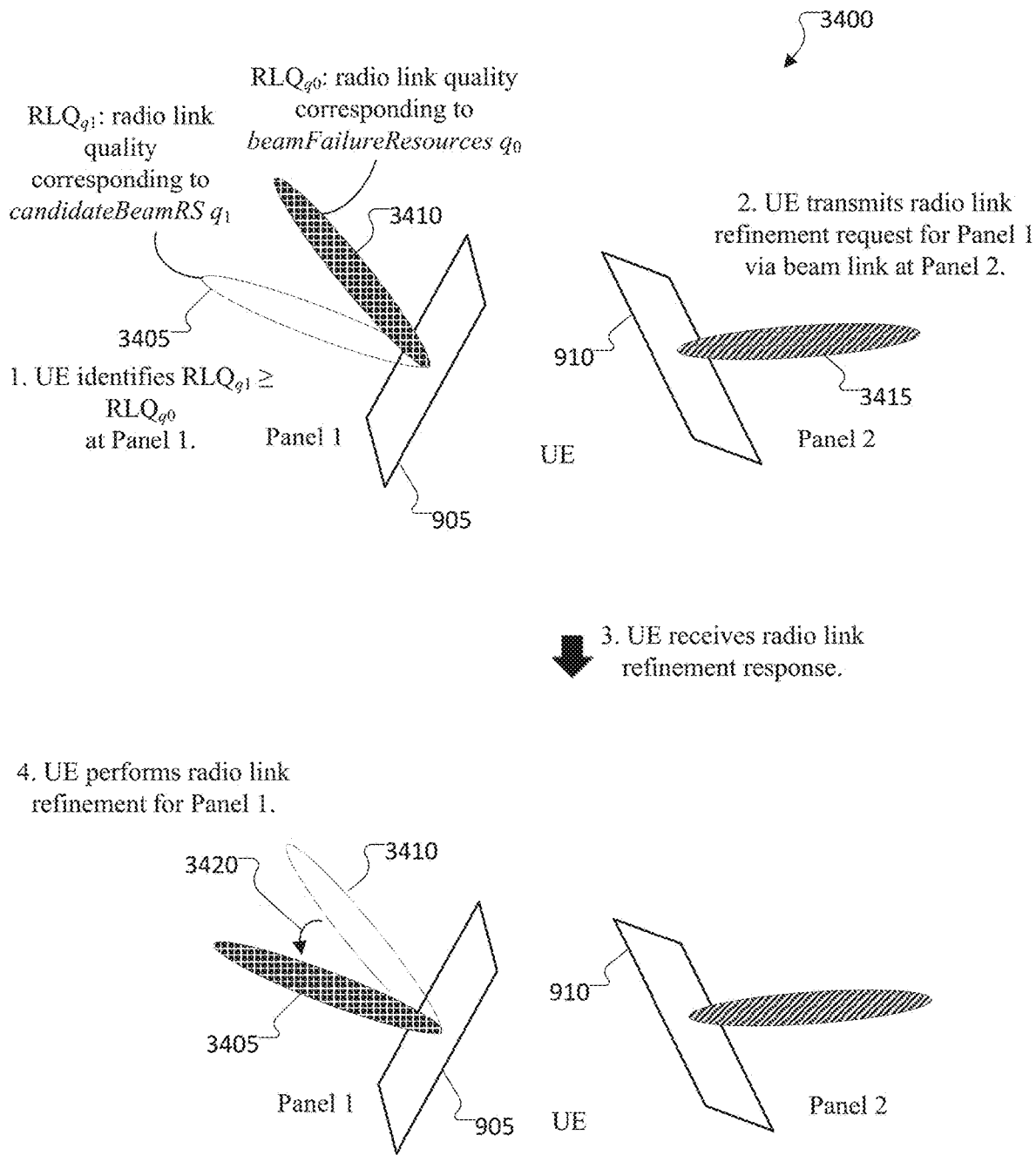
FIG. 34 illustrates a radio link refinement procedure according to embodiments of the present disclosure.

FIG. 34 illustrates a radio link refinement procedure according to embodiments of the present disclosure. The embodiment of the radio link refinement procedure 3400 shown in FIG. 34 is for illustration only. Other embodiments could be used without departing from the scope of the present disclosure.

In certain embodiments, the UE 116 performs measurements of configured RSs, i.e., beamFailureResources $\bar{q}_0$ and candidateBeamRS $\bar{q}_1$ for the first antenna panel 905. The UE 116 evaluates whether radio link quality of $\bar{q}_1$ becomes better than that of $\bar{q}_0$ or not for the first antenna panel 905. Once the UE 116 identifies the radio link quality of the beam link 3405 corresponding to $\bar{q}_1$ becomes better than that of the beam link 3410 corresponding to $\bar{q}_0$ for the first antenna panel 905, the UE 116 transmits RLRQ for the first antenna panel 905 through the current beam link 3415 at the second antenna panel 910. For example, the RLRQ can include the candidate beam RS index and/or the corresponding radio link quality (e.g., SINR and/or $SI_{leakage}$). Then, in one example, the UE 116 can receive RLRR from BS and RLRR includes ACK information. The UE 116, then, performs radio link refinement for the first antenna panel 905 and changes 3420 the current beam 3410 to the candidate beam 3405 for the first antenna panel 905 according to RLRR.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope.

What is claimed is:

1. A user equipment (UE) comprising:
a transceiver configured to communicate via a multi-beam operation with a base station; and
a processor operably coupled to the transceiver, the processor configured to:
transmit, via the transceiver through a first set of antenna ports corresponding to a first antenna panel, one or more uplink (UL) reference signals (RSs),
measure, via the transceiver using a second set of antenna ports corresponding to a second antenna panel, signal qualities of the one or more UL RSs for a time period, and
perform measurement reporting of the measured signal qualities, wherein the measurement reporting comprises:
a number (L) of smallest or largest reference signal received powers (RSRPs) of the one or more UL RSs, and
corresponding RS indices, where 1≤L<N, and N is a number of the one or more UL RSs transmitted, and
wherein the one or more UL RSs are transmitted via a repetition mode at the first set of antenna ports and measured via a beam-sweep mode at the second set of antenna ports, the repetition mode comprising repeatedly transmitting a same UL RS using same UL resources and the beam-sweep mode comprising using different beams.

2. The UE of claim 1, wherein:
the measurement reporting further comprises reference signal received quality/signal to interference and noise ratio (RSRQ/SINR) of RSs, and
the corresponding RS indices are one of synchronization signal block resource indicators (SSB-RIs), sounding resource indicators (SRIs) and channel state information reference signal resource indicators (CRIs).

3. The UE of claim 1, wherein the processor is configured to:
measure block error rates (BLERs) or reference signal received powers (RSRPs) of the one or more UL RSs at the first set of antenna ports;
transmit, via the transceiver, the one or more UL RSs at the second set of antenna ports; and
measure RSRPs of the one or more UL RS, transmitted from the second set of antenna ports, at the first set of antenna ports.

4. The UE of claim 1, wherein to measure the signal qualities, the processor is further configured to:
measure a self-interference leakage by transmitting UL RSs, at the first set of antenna ports, corresponding to candidate beam RSs and measuring the UL RSs at the second set of antenna ports;
measure a signal to interference and noise ratio;
perform a beam failure detection; and
compute a block error rate (BLER) or bit error rate (BER) at the first set of antenna ports while transmitting the one or more UL RSs or UL data signals at the second set of antenna ports.

5. The UE of claim 4, wherein to perform the measurement reporting, the processor is further configured to:
evaluate whether the computed BLER exceeds a threshold;
declare a beam failure event based at least in part on the computed BLER;
identify a new beam $q_{new}$ as a function of SINR equals or exceeds a second threshold and/or $SI_{leakage}$ is less than or equal to a third threshold; and
transmit, via the transceiver, a beam failure recovery request (BFRQ) for the beam failure event at the first set of antenna ports through the second set of antenna ports, wherein to transmit the BFRQ, the transceiver is further configured to:
transmit a scheduling request (SR) to BS through the second set of antenna ports to report the beam failure event happens, where SR is configured based on PUCCH format 0, PUCCH format 1, or other PUCCH formats; and
in response to an UL transmission being granted at the second set of antenna ports, report, through the second set of antenna ports, information on candidate beams in $q_{new}$ can be reported.

6. The UE of claim 1, wherein the processor is configured to:
perform measurements of beamFailureResources $\bar{q}_0$ and candidateBeamRS $\bar{q}_1$ for the first set of antenna ports;
identify candidate beam RS(s)$x \in \bar{q}_1$ such that $SINR_x > SINR_y$ and $SI_{leakage,x} \leq SI_{leakage,y}$, where for any $y \in \bar{q}_0$, wherein $\bar{q}_1$ is a candidateBeamRS and $\bar{q}_0$ is failure DetectionResources; or
evaluate whether radio link quality of $\bar{q}_1$ becomes better than that of $\bar{q}_0$ or not for the first set of antenna ports; and in response to identifying a radio link quality of the beam link corresponding to $\bar{q}_1$ being better than that of $\bar{q}_0$ for the first set of antenna ports, transmit, via the transceiver, a reference signal received quality (RLRQ) for the first set of antenna ports through a current beam link at the second set of antenna ports.

7. A method comprising:
transmitting, via a transceiver through a first set of antenna ports corresponding to a first antenna panel, one or more uplink (UL) reference signals (RSs);
measuring, by a processor via the transceiver using a second set of antenna ports corresponding to a second antenna panel, signal qualities of the one or more UL RSs for a time period; and
performing, by the processor, measurement reporting of the measured signal qualities, wherein the measurement reporting comprises:
 a number (L) of smallest or largest reference signal received powers (RSRPs) of the one or more UL RSs, and
 corresponding RS indices, where $1 \leq L < N$, and N is a number of the one or more UL RSs transmitted, and
wherein transmitting the one or more UL RSs comprises transmitting the one or more RSs via the first set of antenna ports via a repetition mode and measuring comprises measuring the signal qualities via a beam-sweep mode at the second set of antenna ports, the repetition mode comprising repeatedly transmitting a same UL RS using same UL resources and the beam-sweep mode comprising using different beams.

8. The method of claim 7, wherein:
the measurement reporting further comprises reference signal received quality/signal to interference and noise ratio (RSRQ/SINR) of RSs, and
the corresponding RS indices are one of synchronization signal block resource indicators (SSB-RIs), sounding resource indicators (SRIs) and channel state information reference signal resource indicators (CRIs).

9. The method of claim 7, wherein measuring further comprises:
measuring block error rates (BLERs) or reference signal received powers (RSRPs) of the one or more UL RSs at the first set of antenna ports;
transmit the one or more UL RSs at the second set of antenna ports; and
measuring RSRPs of the one or more UL RS, transmitted from the second set of antenna ports, at the first set of antenna ports.

10. The method of claim 7, wherein measuring further comprises:
measuring a self-interference leakage by transmitting UL RSs, at the first set of antenna ports, corresponding to candidate beam RSs and measuring the UL RSs at the second set of antenna ports;
measuring a signal to interference and noise ratio;
performing a beam failure detection; and
computing a block error rate (BLER) or bit error rate (BER) at the first set of antenna ports while transmitting the one or more UL RSs or UL data signals at the second set of antenna ports.

11. The method of claim 7, wherein performing the measurement reporting comprises:
evaluating whether the computed BLER exceeds a threshold;
declaring a beam failure event based at least in part on the computed BLER;
identifying a new beam $q_{new}$ as a function of SINR equals or exceeds a second threshold and/or $SI_{leakage}$ is less than or equal to a third threshold; and
transmitting beam failure recovery request (BFRQ) for the beam failure event at the first set of antenna ports through the second set of antenna ports, wherein the BFRQ comprises:
 transmitting a scheduling request (SR) to BS through the second set of antenna ports to report the beam failure event happens, where SR is configured based on PUCCH format 0, PUCCH format 1, or other PUCCH formats; and
 in response to an UL transmission being granted at the second set of antenna ports, reporting, through the second set of antenna ports, information on candidate beams in $q_{new}$ can be reported.

12. The method of claim 7, wherein measuring further comprises:
performing measurements of beamFailureResources $\bar{q}_0$ and candidateBeamRS $\bar{q}_1$ for the first set of antenna ports;
identifying candidate beam RS(s) $x \in \bar{q}_1$ such that $SINR_x \geq SINR_y$ and $SI_{leakage,x} \leq SI_{leakage,y}$, where for any $y \in \bar{q}_0$, wherein $\bar{q}_1$ is a candidateBeamRS and $\bar{q}_0$ is failure DetectionResources; or
evaluating whether radio link quality of $\bar{q}_1$ becomes better than that of $\bar{q}_0$ or not for the first set of antenna ports; and
in response to identifying a radio link quality of the beam link corresponding to $\bar{q}_1$ being better than that of $\bar{q}_0$ for the first set of antenna ports, transmitting a reference signal received quality (RLRQ) for the first set of antenna ports through a current beam link at the second set of antenna ports.

13. A non-transitory computer readable medium comprising a plurality of instructions that, when executed by a processor of a user equipment (UE), causes the UE to:
transmit, via a transceiver of the UE through a first set of antenna ports corresponding to a first antenna panel, one or more uplink (UL) reference signals (RSs);
measure, via the transceiver using a second set of antenna ports corresponding to a second antenna panel, signal qualities of the one or more UL RSs for a time period; and
perform measurement reporting of the measured signal qualities, wherein the measurement reporting comprises:
 a number (L) of smallest or largest reference signal received powers (RSRPs) of the one or more UL RSs, and
 corresponding RS indices, where $1 \leq L \leq N$, and N is a number of the one or more UL RSs transmitted; and
wherein the plurality of instructions is further configured to cause the UE to transmit the one or more UL RSs via a repetition mode at the first set of antenna ports and measure via a beam-sweep mode at the second set of antenna ports, the repetition mode comprising repeatedly transmitting a same UL RS using same UL resources and the beam-sweep mode comprising using different beams.

14. The non-transitory computer readable medium of claim 13, wherein:
the measurement reporting further comprises reference signal received quality/signal to interference and noise ratio (RSRQ/SINR) of RSs, and
the corresponding RS indices are one of synchronization signal block resource indicators (SSB-RIs), sounding resource indicators (SRIs) and channel state information reference signal resource indicators (CRIs).

15. The non-transitory computer readable medium of claim 13, wherein the plurality of instructions is further configured to cause the UE to:
measure block error rates (BLERs) or reference signal received powers (RSRPs) of the one or more UL RSs at the first set of antenna ports;
transmit the one or more UL RSs at the second set of antenna ports; and
measure RSRPs of the one or more UL RS, transmitted from the second set of antenna ports, at the first set of antenna ports.

16. The non-transitory computer readable medium of claim 13, wherein the plurality of instructions is further configured to cause the UE to:
measure a self-interference leakage by transmitting UL RSs, at the first set of antenna ports, corresponding to candidate beam RSs and measuring the UL RSs at the second set of antenna ports;
measure a signal to interference and noise ratio;
perform a beam failure detection; and
compute a block error rate (BLER) or bit error rate (BER) at the first set of antenna ports while transmitting the one or more UL RSs or UL data signals at the second set of antenna ports, and
wherein the plurality of instructions is further configured to cause the UE to:
perform measurements of beamFailureResources $\bar{q}_0$ and candidateBeamRS $\bar{q}_1$ for the first set of antenna ports;
identify candidate beam RS(s) $x \in \bar{q}_1$ such that $SINR_x \geq SINR_y$ and $SI_{leakage,x} \leq SI_{leakage,y}$, where for any $y \in \bar{q}_0$, wherein $\bar{q}_1$ is a candidateBeamRS and $\bar{q}_0$ is failureDetectionResources; or
evaluate whether radio link quality of $\bar{q}_1$ becomes better than that of $\bar{q}_0$ or not for the first set of antenna ports; and
in response to identifying a radio link quality of the beam link corresponding to $\bar{q}_1$ being better than that of $\bar{q}_0$ for the first set of antenna ports, transmit a reference signal received quality (RLRQ) for the first set of antenna ports through a current beam link at the second set of antenna ports.

17. The non-transitory computer readable medium of claim 16, wherein the measurement reporting comprises:
evaluating whether the computed BLER exceeds a threshold;
declaring a beam failure event based at least in part on the computed BLER;
identifying a new beam $q_{new}$ as a function of SINR equals or exceeds a second threshold and/or $SI_{leakage}$ is less than or equal to a third threshold; and
transmitting beam failure recovery request (BFRQ) for the beam failure event at the first set of antenna ports through the second set of antenna ports,
wherein the BFRQ comprises:
transmitting a scheduling request (SR) to BS through the second set of antenna ports to report the beam failure event happens, where SR is configured based on PUCCH format 0, PUCCH format 1, or other PUCCH formats; and
in response to an UL transmission being granted at the second set of antenna ports, reporting, through the second set of antenna ports, information on candidate beams in $q_{new}$ can be reported.

* * * * *